(12) United States Patent
Bowen et al.

(10) Patent No.: US 8,195,382 B2
(45) Date of Patent: Jun. 5, 2012

(54) MULTIPLE DRIVER OCCUPIED PASSENGER VEHICLES TRANSPORTER SYSTEM

(75) Inventors: William R. Bowen, Holladay, UT (US); Reid G. Oliver, Salt Lake City, UT (US); David Ware, Glen Ellyn, IL (US)

(73) Assignee: Clean Transport, Chicago, IL (US)

( * ) Notice: Subject to any disclaimer, the term of this patent is extended or adjusted under 35 U.S.C. 154(b) by 852 days.

(21) Appl. No.: 12/258,200

(22) Filed: Oct. 24, 2008

(65) Prior Publication Data

US 2010/0104392 A1    Apr. 29, 2010

(51) Int. Cl.
*G06F 19/00* (2011.01)
(52) U.S. Cl. ....................................................... 701/117
(58) Field of Classification Search ...... 701/1, 117–119, 701/213
See application file for complete search history.

(56) References Cited

U.S. PATENT DOCUMENTS

| | | | |
|---|---|---|---|
| 3,285,194 | A | 11/1966 | Clejan |
| 3,584,584 | A | 6/1971 | Milenkovic |
| 3,933,258 | A | 1/1976 | Forsyth et al. |
| 4,124,119 | A | 11/1978 | Nordstrom |
| 5,199,358 | A | 4/1993 | Barratt |
| 5,592,883 | A | 1/1997 | Andress, III |
| 5,775,227 | A | 7/1998 | Mullen |
| 2004/0148083 | A1* | 7/2004 | Arakawa et al. ................ 701/50 |
| 2004/0198254 | A1* | 10/2004 | Mizui et al. ..................... 455/99 |
| 2005/0146422 | A1* | 7/2005 | Ando et al. ................ 340/426.1 |
| 2008/0030345 | A1* | 2/2008 | Austin et al. .............. 340/572.8 |

OTHER PUBLICATIONS

Frank et al., SAE Technical Paper Series, "A Mass Transit System for Cars to Increase Freeway Use," Future Transportation Technology Conference and Exposition, San Francisco, California, Aug. 8-11, 1988, 12 pages.
Frank, Andrew A., A Vehicle Mass Transit System for Greatly Improved Mobility Using the Existing Infrastructure, University of California, Davis, undated, 8 pages.
Frank, Andrew A., A Technical Solution for Future Transportation Using the Existing Roadway and Urban/Suburban Infrastructure and Policies, University of California, Davis, undated, 9 pages.
Petrie, David, "Moving EVS Into a Mass Transit Scenario," Electric & Hybrid Vehicle Technology, 1995, 4 pages.
Integrated Transportation System Infopage, www.weber.u. washington.edu/~jbs/itrans/its.htm, May 1998, 3 pages.
International Search Report dated Feb. 18, 2010 for corresponding PCT Application No. PCT/US2009/061496.
David Petrie, Petrie Transit Consultants, "Car Bus Demonstrator," presented at the Canadian Transportation Research Forum, Prince Edward Island, Canada, Jun. 4-7, 2000, 7 pages, retrieved from the Internet, http://faculty.washington.edu/jbs/itrans/petrie_paper.htm.

* cited by examiner

*Primary Examiner* — Hussein A. Elchanti
(74) *Attorney, Agent, or Firm* — Brinks Hofer Gilson & Lione

(57) ABSTRACT

The multiple driver occupied passenger vehicles transporter system (Autobus) provides a way to efficiently, economically and safely increase the highway vehicle flow rate of cars per lane per hour. Autobus employs a vehicle transporter, terminal, sensors and systems that provide a way to quickly load and unload driver occupied passenger vehicles on and off of the vehicle transporter. Autobus provides a way to safely transport multiple driver occupied passenger vehicles, including cars, sport utility vehicles (SUVs) and light trucks.

22 Claims, 13 Drawing Sheets

MULTIPLE DRIVER OCCUPIED PASSENGER VEHICLES TRANSPORTER SYSTEM

BACKGROUND OF THE INVENTION

1. Technical Field

This disclosure concerns a way to efficiently, economically and safely increase the highway vehicle flow rate of passenger vehicles per highway lane per hour. In particular, this disclosure relates to a vehicle transporter system that provides a way to quickly and efficiently load and unload driver occupied passenger vehicles on and off of a vehicle transporter and safely transport the driver occupied passenger vehicles.

2. Background Information

Traffic congestion, both in the U.S. and around the world, continues to increase because the number of vehicles on roadways, arterials, and streets and roads continues to increase as population and wealth increase, and as annual miles traveled per vehicle increase due to the spread of cities outward and other demographic, economic and social factors. In the U.S., as well as in many other nations, congestion for several decades has continued to increase because the rate at which highway capacity is constructed remains significantly below the rate of growth in highway vehicle miles traveled. As a result, more and more vehicles attempt to utilize highway capacities intended to support one-third or one-fourth of today's traffic demands. Long-range U.S. Department of Transportation (USDOT) databases indicate that statistics for the years 1980 to 2003 for annual vehicle miles traveled steadily increased at approximately 4.0% per year, but highway capacity increased only about 1.4% per year.

There are at least three fundamental variables that affect roadway traffic flow: 1) traffic in-flow capacity; 2) roadway segment design capacity; and 3) traffic out-flow capacity. Traffic in-flow capacity determines the number of vehicles flowing into a given roadway segment. If the number of vehicles flowing into the segment is low in relation to the capacity of the segment, then traffic density on the segment will be low. Traffic normally flows near, or even above, the maximum intended speed and traffic congestion is less likely to occur. If the number of vehicles flowing into the segment for a given period of time is higher than the segment can accommodate for that period of time, then traffic backs up onto the roads and streets. Such back ups cause traffic jams on the feeder roads and streets, and on the given segment and upstream of the feeder roads and streets. The traffic flow of feeder roads that route traffic into a roadway segment is a determining factor as to the amount of traffic that may utilize the roadway segment.

Roadway segment design capacity generally determines the intended traffic capacity of the roadway segment. The number of lanes of the roadway segment and associated structures (e.g., on-ramps, off-ramps, traffic signals, interchanges and intersections) are built with the intention of accommodating expected and forecasted traffic demand, given budget constraints, physical limitations (e.g., natural features such as mountains, rivers and lakes) and the presence of the human-built environments (e.g., cities, industrial zones, neighborhoods, and transportation facilities such as railways and airports).

Current road design technology affords a maximum sustainable per lane traffic capacity for a nominal, well-designed roadway lane of about 2,000 to 2,200 passenger cars per lane per hour assuming good, daylight driving conditions and no disruptive conditions or events. Vehicles larger than passenger cars that occupy more roadway space per vehicle than standard passenger cars are considered by traffic engineers and roadway designers in terms of "passenger-car-equivalents". For example, a large freight truck may be assigned a "passenger-car-equivalence" of 3 passenger cars. A four-lane roadway nominally has a maximum capacity in the range of 8,000 to 8,800 cars per hour equivalent to 2,000 to 2,200 cars per lane per hour. Experience and numerous empirical and theoretical traffic flow studies provide comprehensive evidence that when traffic flows exceed 2,000 to 2,200 cars per lane per hour, traffic flows become progressively unstable and unsustainable. This instability is due to random variations in vehicle spacing, driver skills and performance, and a reduction in the available time to perform particular traffic maneuvers and spacing between vehicles that prevent a driver from performing the traffic maneuvers. As traffic flows increase above the range of 2,000 to 2,200 cars per lane per hour, traffic then becomes increasingly subject to chaotic break down from smooth, high-speed traffic flows into stop and start very low-speed, traffic jams. During such traffic jams, vehicles are characteristically very closely spaced with separations between vehicles at ten to twenty foot intervals from the front bumper of one vehicle to the rear bumper of the next vehicle. Such traffic jams typically result in traffic flows decreasing to 1,000 passenger cars per lane per hour, or even less.

Traffic outflow capacity (e.g., the maximum number of vehicles that can leave a roadway segment per hour) depends on the traffic capacity and temporal traffic condition of roadway exits and outbound interchanges. If the traffic capacity of exit roadways is too low, and/or if traffic on the roadway exits is not flowing at or below outflow capacity of those roadway exits, then traffic attempting to exit onto the exit roadway backs up onto the roadway segment feeding the exit roadway, which causes delays, slow and/or chaotic traffic flow, and breakdown into persistent very low flow, jammed conditions.

Other factors that may impact traffic flows and/or render traffic conditions problematic include: visibility; weather conditions; accidents and incidents; stochastic effects; erratic and abnormal driver behavior; public safety traffic; construction zones; and special events. Driving under conditions of darkness, or any lighting condition less favorable than normal daytime lighting, decreases driver performance and suppresses traffic flows. Adverse weather depresses traffic flows, including snow, rain, icing or hydroplaning road conditions, high winds and gusts. Adverse weather conditions create driving dangers that require slower speeds and create fundamentally unpredictable chaotic conditions that depress traffic flows. Traffic accidents may block one or more lanes for unknown amounts of time, depending upon the severity of the accident and the degree of emergency vehicle access to the accident scene. Similarly, vehicles suffering flat tires or mechanical problems may block or disrupt traffic until the affected vehicle is repaired or removed. According to USDOT, traffic accidents and incidents cause approximately 25 percent of all congestion. Each minute of lane blockage creates about four minutes of congestion after the incident is cleared. USDOT indicates that the best performing state transportation agencies clear traffic accidents and incidents within approximately 22 minutes of on-scene arrival, which suggests that in zones subject to persistent congestion, accidents and incidents may create more than 1.5 hours of congestion on average.

Traffic congestion may be explained by the stochastic effects of traffic congestion that occurs due to any number of reasons, and results in traffic slowing and throughput of vehicles diminishing. On a road segment operating at or near its sustainable capacity, the start of congestion may create a vicious cycle effect in which minor congestion creates more congestion, and so on, until the segment is in a bumper to bumper, stop and go jam. A traffic accident may result in "rubber-necking" as drivers moving past the accident slow down more than needed, or for longer than needed, in order to satisfy their curiosity. In such conditions congested zones may lengthen toward the traffic input facilities of the segment because the capacity-level inputs, or near capacity-level inputs continue to feed traffic into the jam. Public safety traffic (e.g., emergency vehicles) moving at high speed and having legal lane priority cause flow disruptions and suppress traffic throughput. Highway arrests for traffic violations cause traffic suppression effects similar to accidents and incidents. Erratic and/or abnormal drivers (e.g., drivers driving at either abnormally high or abnormally low speeds and/or drivers weaving from lane to lane) disrupt normal traffic and suppress throughput. Impaired, inattentive drivers and drivers otherwise unable to control their vehicles force normal drivers to adjust their driving in ways that disrupt free flow traffic.

Construction zones for highway construction and/or rehabilitation projects commonly remove one or more lanes of capacity from highways thereby reducing traffic throughput and frequently causing severe traffic congestion. USDOT estimates that construction zones account for approximately ten percent of all U.S. traffic congestion. Special events (e.g., athletic, entertainment events, and annual holidays) create surges of traffic that may cause traffic demand levels to exceed available traffic capacity with regard to input capacity, segment design capacity and/or outflow capacity.

Some experts conclude that in developed societies like the United States, the most practical roadway paths have already been put into highway use, and the growth of surrounding urban development and physical constraints (e.g., geographical and environmental) make expansion of existing roadways and/or construction of new roadways too expensive to be practical. The addition of roadway capacity may also be legally constrained by environmental laws, successful environmental lawsuits, and/or the political action of highway opponents. Furthermore, there have been periods in recent U.S. history when funds collected for the stated purpose of highway construction and maintenance have been withheld by the federal government and made unavailable to states, counties and cities for highway capacity maintenance and expansion.

Many highway experts consider urban/suburban highway capacity expansion by the conventional means of adding new lane miles to existing roadway systems in amounts sufficient to resolve congestion (e.g., an estimated doubling and/or tripling of highway capacity) impossible, as a practical matter, because of space constraints, budget limitations, legal and political realities. In the future, more and more critical highways may be expected to show multiple factor capacity deficiencies as populations increase and highway travel demands rise accordingly.

Addressing the deficiency of highway capacity in urban/suburban settings is further complicated by empirical limitations demonstrated by currently available or reasonably foreseeable technologies that address highway congestion. These technologies are, for the most part, intended to make highways run more efficiently, or to reduce the frequency of events that create congestion. Current congestion reduction methods and technologies primarily operate within the long-standing optimum throughput band of approximately 2,000 to 2,200 passenger cars per lane per hour. The intended effect of these technologies is to sustain these flow levels and prevent, to the extent possible, events that create congestion and reduce vehicle flows substantially below the 2,000 to 2,200 cars per lane per hour level.

Some traffic congestion programs (e.g., transit systems, organized van pools, and variable highway toll programs) are intended in part or in whole to reduce the number of vehicles present on urban/suburban highways, especially during peak traffic demand periods. These efforts have proved to have only nominal success in most settings as evidenced by the following considerations: 1) highway vehicle miles traveled per year continues a steady compound annual rise of approximately 4%; 2) despite a sharply increased investment in transit systems all across the U.S., transit systems produce 1.5% percent of U.S. urban/suburban passenger miles; and 3) the annual urban/suburban passenger miles produced by transit systems has declined since 1970 from a 3.63% share to a 1.5% share in 2005. The annual highway congestion indices compiled by the Texas Traffic Institute for states and urban areas rise steadily, especially for very large (e.g., a population of +3 million) and large (e.g., a population of 1 m to 3 m) urban areas. Thus, transportation systems and traffic demand reduction programs have not been successful at reducing traffic congestion in the U.S.

SUMMARY

The multiple driver occupied passenger vehicles transporter system (Autobus) provides a way to efficiently, economically and safely increase the highway vehicle flow rate of passenger vehicles per lane per hour. Autobus employs a vehicle transporter, terminal, sensors and systems that provide a way to quickly load and unload driver occupied passenger vehicles on and off of the vehicle transporter. Autobus provides a way to safely transport multiple driver occupied passenger vehicles, including cars, sport utility vehicles (SUVs), light trucks, larger tradecraft pickups and some smaller commercial vehicles. Municipalities may integrate Autobus with existing traffic management systems so that Autobus is used to provide real-time on demand variable traffic capacity.

Autobus addresses at least four areas of national concern: 1) reduction of greenhouse gas emissions; 2) reduction of air pollution; 3) energy independence; and 4) resolution of urban roadway traffic congestion. Autobus provides a way to efficiently, economically and safely increase the highway vehicle flow rate from 2,000 to 2,200 cars per lane per hour to a range of 8,000 to 9,000 cars per lane per hour. In one implementation, Autobus uses dedicated lanes to isolate Autobus operations from stochastic traffic congestion and disruptions due to emergency vehicles and abnormal drivers.

Autobus is a highly-integrated "roadway land ferry" concept (e.g., seamless intermodal transportation) employing passenger vehicles and vehicle transporters. Autobus transporters are configured to transport driver occupied passenger vehicles through congested highway zones at the highest safe and permitted roadway speeds. Autobus is highly automated and allows for simultaneous loading and unloading of passenger vehicles to and from the transporters. Autobus may enhance other transportation systems such as bridges and tunnels, advanced highway systems (e.g., advanced traffic management systems "ATMS" and advanced travel information systems "ATIS") with minimal community impact while maximizing utilization of existing highway infrastructure, because Autobus may employ existing roads and highways.

In one implementation, Autobus includes multiple Autobus routes (e.g., roadway segments served by Autobus) within a metropolitan area deployed to address persistently heavily congested highway facilities. Autobus may be deployed for a single route located on a heavily congested segment of a multi-lane highway with an Autobus terminal at each end of the segment and at least one Autobus served lane between the terminals. Much more complex Autobus routes may be organized in metropolitan areas where multiple interconnecting highways exhibit persistent heavy congestion. Complex Autobus routes may be supported by multiple Autobus terminals accommodating multiple destinations over multiple distinct highways (e.g., including route to route transfer facilities).

Autobus may designate additional lanes of a served roadway segment for Autobus service by activating roadway signage along the served roadway segment. Autobus transporters may also be directed to alternative exit terminals where adequate outflow capacity exists in order to increase and/or maintain desired roadway segment capacity.

In one implementation, Autobus terminals are configured so that Autobus transporters operate exclusively on the interior lanes of major trunk line highway facilities. Autobus terminals and route systems provide optimum traffic flows because: 1) conventional traffic does not interfere with the high-speed, high-frequency, high-vehicle flow operation of the transporters; 2) serious traffic disruptions that would occur if transporters were required to change lanes through conventional traffic are avoided; and 3) transporters enter and exit Autobus terminals optimally without conventional traffic interference.

Autobus offers variable, and/or on-demand, capacity increase roadway traffic capability (e.g., regulating in real-time the number of transporters used to serve designated roadway segments). For example, new construction zones may be identified that impact a particular roadway segment and the number of transporters may be adjusted in response to serve. Autobus and the various components of Autobus may work together to automatically identify variable traffic conditions (e.g., new construction zones, special events and weather) and automatically respond by adjusting the number of transporters deployed to a served roadway segment and/or multiple roadway segments and routes. Autobus may increase the number of transporters deployed to roadway segment based on severe weather because Autobus transporters are much more robust and much less vulnerable in severe weather than standard passenger vehicles.

The multiple driver occupied passenger vehicles transporter system (Autobus) provides a system that includes: multiple driver occupied passenger vehicles; a roadway segment serviced by Autobus; an Autobus enhanced geo-positioning system (AEGPS) handset; a vehicle transporter comprising vehicle modules; vehicle compartments; a vehicle transporter terminal comprising: terminal sensors; terminal lane directional aides; payment systems and facilities; and terminal docks. Autobus system further includes: a memory comprising: location and status information for the multiple driver occupied passenger vehicles and vehicle transporters; vehicle compartment status information; terminal sensor information; Autobus logic operable to: analyze the terminal sensor information and the vehicle compartment status information; actuate the terminal lane directional aides and the vehicle modules and/or vehicle compartments, based on the location and status information for the multiple driver occupied passenger vehicles; and communicate the vehicle compartment status and the status of the driver occupied passenger vehicles to a transporter driver; and a processor coupled to the memory, wherein the processor executes the Autobus logic. The vehicle compartments may include lower level vehicle compartments and upper level vehicle compartments. In one implementation, an upper vehicle compartment and a lower vehicle compartment located below the upper vehicle compartment are joined to form a vehicle module that is lifted/lowered, separated/joined from/to adjoining modules and rotated as a unit.

The terminal dock may include a vehicle transporter level dock where the vehicle transporter is positioned to load and unload passenger vehicles. A terminal may include multiple terminal docks. The vehicle transporter level dock may provide multiple transporters assigned locations within the vehicle transporter level dock so that multiple driver occupied passenger vehicles may be simultaneously loaded and/or unloaded the multiple transporters. The terminal dock includes a load side comprising: a lower vehicle compartment level dock for loading driver occupied passenger vehicles in the lower level vehicle compartments; and an upper vehicle compartment level dock for loading driver occupied passenger vehicles in the upper level vehicle compartments. The terminal dock includes an unload side comprising: a lower vehicle compartment level dock for unloading driver occupied passenger vehicles in the lower level vehicle compartments; and an upper vehicle compartment level dock for unloading driver occupied passenger vehicles in the upper level vehicle compartments.

In one implementation, the terminals (e.g., vehicle transporter level dock) include transporter recharging and/or refueling stations and/or connectors that allow transporter vehicles to be recharged and/or refueled so that in addition to recharging and/or refueling the transporter vehicle the driver occupied passenger vehicles transported in vehicle compartments may be recharged and/or refueled during transport. The terminals may provide driver occupied passenger vehicles recharging and/or refueling stations so that driver occupied passenger vehicles may recharge and/or refuel without being transported. The travel range of a vehicle may be extended by recharging and/or refueling the vehicle while transporting the vehicle using the transporter. For example, a vehicle may have a limited daily travel range due to the type of power system used by the vehicle (e.g., electricity, hydrogen fuel, and natural gas). However, using a transporter to transport and recharge and/or refuel the vehicle while transporting the vehicle to a destination terminal from an originating terminal, the vehicle may travel (e.g., origination travel) to an originating terminal within the daily travel range of the vehicle, recharge during transport to the destination terminal, and travel (e.g., destination travel) within the daily travel range of the vehicle once the vehicle unloads from the transporter. In another example, a delivery vehicle that travels long distances to pickup items from an origination location (e.g., an airport, railway and/or shipping facility) in order to deliver those items to a metropolitan area uses fuel and/or energy that would otherwise be saved by using a transporter. Consider a fleet of delivery vehicles that are loaded onto a transporter and transported to a first destination located in proximity to a pickup facility (e.g., an airport, railway and/or shipping facility). Once the fleet of delivery vehicles pickup the items to be delivered, the delivery vehicles are loaded onto a transporter that transports the delivery vehicles to a second destination located in proximity to the delivery area (e.g., city, metropolitan area, and/or corporate campus). During transport, the delivery vehicles may recharge and/or refuel. The daily travel range of the delivery vehicles may not only be extended using transporters, the energy consumed (e.g., fuel used) by the fleet of delivery vehicles may be substantially reduced. During transport to the second destination in proximity to the delivery area, the delivery vehicle drivers may use the time on the transporter to organize and plan the delivery and/or engage in tasks that improve the efficiency and profitability of the delivery service and the customer experience.

The vehicle compartments may include: an amenities module; a deck designated the floor of the vehicle compartment; a roof designated the ceiling of the vehicle compartment, wherein the roof comprises a left side and a right side of the roof; a load ramp barrier assembly designated the rear of the vehicle compartment (e.g., rear panel of the vehicle compartment); an unload ramp barrier assembly designated the front of the vehicle compartment (e.g., front panel of the vehicle compartment); and a driver side panel and a passenger side panel, wherein the driver side panel and the passenger side panel each have a forward edge connected to the unload ramp barrier assembly and a rear edge connected to the load ramp barrier assembly. The amenities module may be connected to the driver side panel and the amenities module comprises: a display; a multimedia communication device; and an environmental controls device. The environmental controls device may include client vehicle heating, air conditioning, cabin lighting and accessories power ports. In one implementation, the front and rear panels and the driver side and passenger side panels of each vehicle compartment comprise vehicle compartment windows and/or graphical displays that allow vehicle drivers to see outside of the vehicle compartment.

In one implementation, the amenities module, vehicle module and/or vehicle compartment include vehicle refueling-recharging connectors that connect to the vehicle in the vehicle compartment to deliver and/or supply fuel (e.g., electricity, natural gas, gasoline and hydrogen) to the vehicle while the vehicle is being transported by the transporter. The transporter may be recharged and/or refueled at the terminal so that the transporter provides the fuel (e.g., electricity, natural gas, gasoline and hydrogen) to the vehicles while the vehicles are being transported by the transporter. The Autobus terminals may also provide vehicle refueling-recharging stations for vehicles to re-fuel and/or recharge (e.g., electricity, natural gas, gasoline and hydrogen).

The vehicle compartments may include: a vehicle compartment frame comprising vertical frame ribs, wherein the deck, the roof, the driver side panel, the passenger side panel, the load ramp barrier assembly, and the unload ramp barrier assembly are connected to the vehicle compartment frame, and wherein the vertical frame ribs include: a front left side vertical frame rib that is connected to the unload ramp barrier assembly and the driver side panel; a front right side vertical frame rib that is connected to the unload ramp barrier assembly and the passenger side panel; a rear right side vertical frame rib that is connected to the load ramp barrier assembly and the passenger side panel; and a rear left side vertical frame rib that is connected to the load ramp barrier assembly and the driver side panel. The unload ramp barrier assembly may further include a bridge assembly. In one implementation, the load and unload sides of a terminal dock each include an unload ramp barrier assembly that further includes a bridge assembly.

The vehicle transporter may further include: a transporter main frame beam assembly connected to a first vehicle compartment lift, separation and rotation assembly, wherein the transporter main frame beam assembly comprises vehicle compartment locking foot wells for each of the lower level vehicle compartments, and wherein the roof of each of the lower level vehicle compartments comprise vehicle compartment locking foot wells on each of the left side and right side of the roof. The terminal dock may also comprise: a terminal dock ceiling and an overhead lift beam assembly, wherein the overhead lift beam assembly is connected to a second vehicle compartment lift, separation and rotation assembly, and wherein the overhead lift beam assembly is connected to the terminal dock ceiling. In one implementation, the second vehicle compartment lift, separation and rotation assembly, connected to the overhead lift beam assembly, lowers and lifts upper vehicle compartments and lower vehicle compartments (e.g., joined to form vehicle modules) to and from the transporter, and joins and separates adjacent vehicle compartments of adjacent vehicle modules from each other, and rotates lower vehicle compartments and upper vehicle compartments (e.g., as vehicle modules) into unload/load positions.

In one implementation, the transporter main frame beam assembly and the overhead lift beam assembly are mirrored configurations, although the former is connected to the vehicle transporter and the latter is connected to the terminal dock ceiling. In one implementation, the first vehicle compartment lift, separation and rotation assembly, connected to the transporter main frame beam assembly, lowers and lifts the upper vehicle compartments and the lower vehicle compartments (e.g., joined to form vehicle modules) to and from the transporter main frame beam assembly, separates, and joins and separates adjacent vehicle compartments of adjacent vehicle modules from each other, and rotates lower vehicle compartments and upper vehicle compartments (e.g., as vehicle modules) into unload/load positions.

The Autobus system memory may further include: global positioning system (GPS) information; and traffic management information, the traffic management information including: historical traffic management information; forecasted traffic information; weather forecasts; special event information; and real-time traffic information.

The Autobus logic may include: Autobus flow optimization computer system (AFOCS) logic; Autobus enhanced geopositioning system (AEGPS) logic; load/unload ramp and bridge logic; module lift logic; module separation logic; module rotation logic; vehicle wheel lock logic; and amenities module logic. The amenities module logic may include pneumatic control logic. The Autobus logic may also include: automated distance keeping system (ADKS) logic, including braking logic and safety system logic; and suspension systems logic that monitors the suspension of the vehicle transporter, determines suspension settings that minimize impulse stress loads on overpasses and bridges as the transporter travels on the overpasses and bridges.

The load/unload ramp and bridge logic actuates the load ramp barrier assembly and the unload ramp barrier assembly. The module lift logic actuates the first vehicle compartment lift, separation and rotation assembly and the second vehicle compartment lift, separation and rotation assembly to lower and lift the upper vehicle compartments to and from the lower vehicle compartments and lower and lift lower vehicle compartments to and from the transporter main frame beam assembly. In one implementation, module lift logic uses hydraulic, pneumatic, and/or electric power to actuate the first vehicle compartment lift, separation and rotation assembly and the second vehicle compartment lift, separation and rotation assembly. In one implementation, hydraulic, pneumatic, and/or electric power systems are used to actuate the various components of the transporter, lift, separation and rotation assemblies, vehicle modules and/or vehicle compartments.

The module separation logic actuates the first vehicle compartment lift, separation and rotation assembly and the second vehicle compartment lift, separation and rotation assembly to actuate the vertical frame ribs to join and separate the vehicle compartments to and from each other, and actuates the first vehicle compartment lift, separation and rotation assembly to lock and unlock the lower vehicle compartments to and from the transporter main frame beam assembly. In one implementation, module separation logic uses hydraulic, pneumatic, and/or electric power to actuate the first vehicle compartment lift, separation and rotation assembly and the second vehicle compartment lift, separation and rotation assembly.

The module rotation logic actuates the first vehicle compartment lift, separation and rotation assembly and the second vehicle compartment lift, separation and rotation assembly to rotate the vehicle compartments into position to load and unload the vehicle compartments, join and separate the vehicle compartments that are adjacent to each other, and lock and unlock the lower vehicle compartments to and from the transporter main frame beam assembly.

Other systems, methods, products and features of the invention will be, or will become, apparent to one with skill in the art, upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
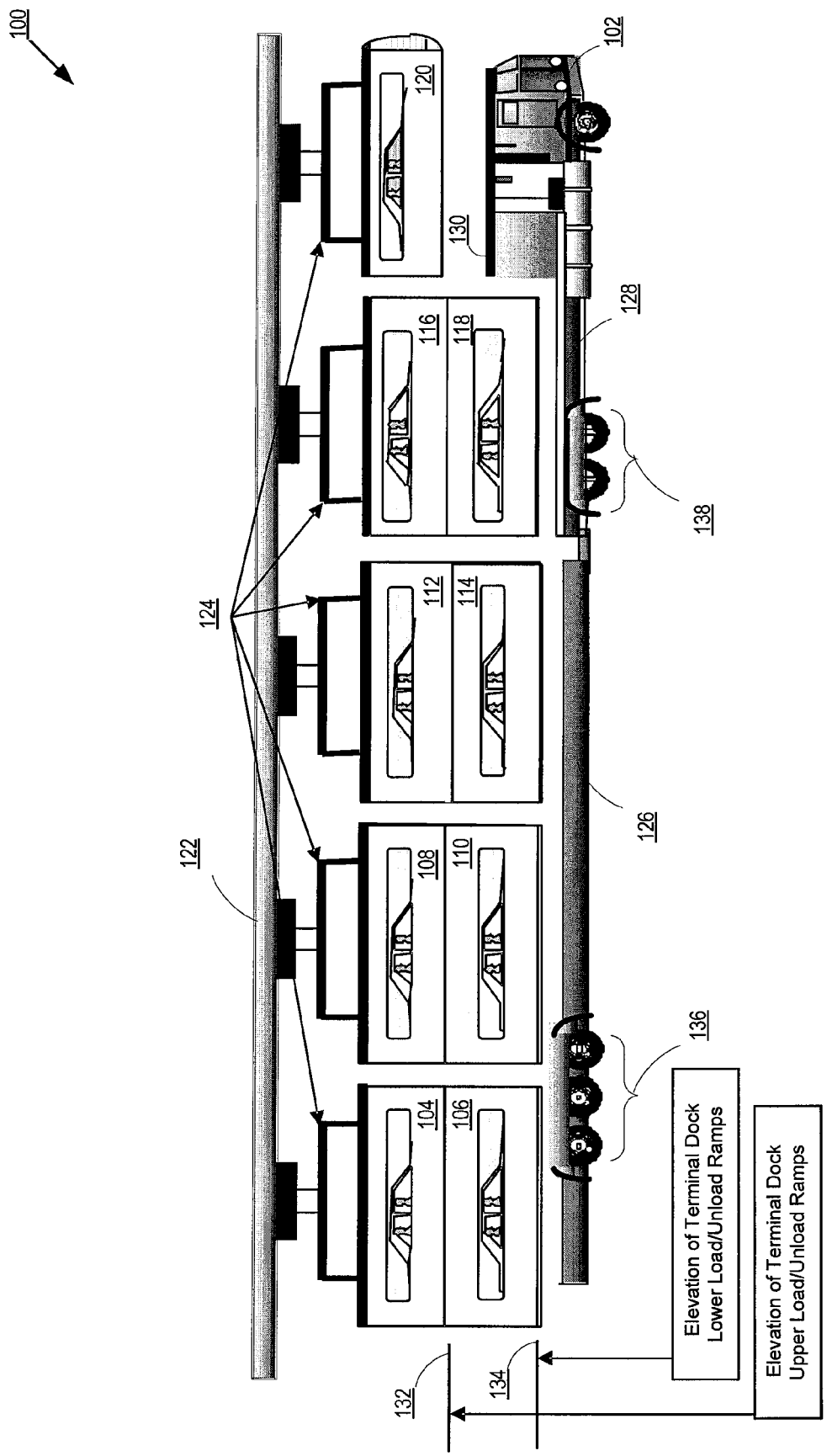
FIG. 1 illustrates an Autobus configuration with a vehicle transporter and vehicle compartments below a terminal dock overhead lift beam assembly.

Autobus provides a comprehensive urban/suburban passenger vehicle transport system that combines the current best technologies for area-wide traffic forecasting, traffic control and traffic flow optimization with new technologies that offer previously unavailable lane flow capacities. Autobus is a comprehensive urban and suburban roadway passenger vehicle transportation system. Autobus may be used for any segment of urban and/or suburban roadway (e.g., roadways, arterials, city streets and roads). Autobus provides: 1) optimizes traffic flows at levels much higher than previously possible and/or practical; 2) reduces traffic congestion; 3) reduces transportation consumption of petroleum-based fossil fuels, and thereby contributes to "national energy independence"; and 4) reduces transportation-related emissions of air pollutants (e.g., greenhouse gas $CO_2$ and EPA criterion pollutants including $SO_x$, $NO_x$, CO, HC, $PM_{10}$ and $PM_{2.5}$).

In order to optimize traffic flows for a roadway segment the sustainable traffic capacity of the roadway segment should match the inflow demand and capacity and the outflow capacity from the roadway segment should be equal to or higher than the sustainable traffic flow capacity of the roadway segment. Optimum traffic flow is considered the successful, normal and regular accommodation of all regular and normal predicted traffic demand (e.g., on a given surface roadway traffic facility, and/or in a specified urban/suburban area) with free-flow (e.g., American Association of State Highway and Transportation Officials—"AASHTO"—Level of Service C or better) traffic conditions at or above intended design speeds, and at or above intended design traffic flows (e.g., the absence of traffic congestion). Sub-optimum traffic flow, conversely, is defined as the normal and regular presence of traffic congestion (e.g., AASHTO Level of Service D or worse) on the given segment or in the given urban/suburban area.

Autobus includes: 1) terminal facilities that manage the traffic of client vehicles and Autobus transporters; 2) load/unload docks that client vehicles use to enter and exit vehicle compartments of the transporters; 3) systems that provide optimized high-speed, simultaneous unload/load of the transporters; and 4) terminal and dock facility signage systems and controls that support high-speed unload/load operations, and toll payment systems. Autobus may be configured for city to city transportation.

Autobus transporters may include railway transporters, as well as roadway transporters. Autobus terminals may provide docks to load/unload roadway transporters to and from railway transporters, and/or load/unload passenger vehicles to and from vehicle compartments of the railway transporter. Autobus railway transporters may transport roadway transporters and/or vehicle compartments to Autobus terminals where the roadway transporters unload/load.

Autobus transporters may be configured to transport variable number of tradecraft pickup trucks and/or small commercial service trucks. Autobus transporters may be configured to use vehicle compartments sized to transport tradecraft pickups and/or small commercial service trucks.

Autobus may be implemented to provide service to multiple roadway segments within a metropolitan area and/or a single route located on a heavily congested segment of a multi-lane highway. Autobus terminals are located at each end of a serviced roadway segment. Much more complex Autobus routes may be organized in metropolitan areas where multiple interconnecting highways exhibit persistent heavy congestion. Complex Autobus routes may be supported by multiple Autobus terminals accommodating multiple interconnecting roadway segments.

Autobus offers variable, and/or on-demand, capacity increase capability (e.g., regulating in real-time the number of transporters used to serve roadway segments). For example, new construction zones may be identified that impact a particular roadway segment and the number of transporters may be adjusted in response to serve. Autobus may access various systems internal and external (non-Autobus) systems in order to automatically identify variable traffic conditions (e.g., new construction zones, special events and weather) and adjust the number of transporters deployed to a served roadway segment. For example, Autobus may increase the number of transporters deployed to a particular roadway segment served by Autobus, based on forecasted and/or current severe weather conditions because Autobus transporters are much more robust and much less vulnerable in severe weather than standard passenger vehicles.

Autobus may be used to evacuate large numbers of driver occupied passenger vehicles from an emergency area (e.g., severe weather conditions) while minimizing the amount of fuel used for the evacuation. For example, in a severe storm fuel may not be available to refuel all vehicles to travel out of a severe weather area. However, vehicles loaded onto transporters may be transported out of the severe weather area while conserving scare fuel within the severe weather area. Autobus may also be used to quickly and efficiently transport emergency vehicles to a particular area, while conserving fuel and/or refueling the emergency vehicles during transport so that the emergency vehicles do not deplete fuel while traveling into an emergency area. In other words, Autobus transporters provide a way to address situations where fuel availability is limited (e.g., emergency evacuation sites and/or bringing emergency vehicles into an emergency site). Autobus transporters may be equipped with ramp and bridge assemblies that allow load and unload of vehicles to and from transporters without Autobus terminals. In another implementation, ramps and bridge assemblies are configured so vehicles may load and/or unload to and from a transporter without using a terminal.

FIG. 1 illustrates an Autobus configuration 100 with a vehicle transporter 102 and vehicle compartments (e.g., 104, 106, 108, 110, 112, 114, 116, 118, and 120) below a terminal dock overhead lift beam assembly 122. The terminal dock overhead lift beam assembly 122 is connected to a vehicle compartment lift, separation and rotation assembly 124. In one implementation, Autobus transporters 102 are configured to transport 9 driver occupied vehicles loaded into individual vehicle compartments (e.g., 104, 106, 108, 110, 112, 114, 116, 118, and 120), in order to optimize the number of client vehicles (e.g., 9,000 client vehicles) traveling over a roadway segment lane per hour. Vehicle compartments (e.g., upper vehicle compartments 104, 108, 112, 116 and 120 and lower vehicle compartments 106, 110, 114, and 118) are locked to a vehicle transporter main frame beam assembly (e.g., 126 and 128) and transporter cab beam assembly (e.g., 130) of the transporter and each vehicle compartment is locked to adjacent vehicle compartments before transporting the vehicle compartments.

Figure 4:
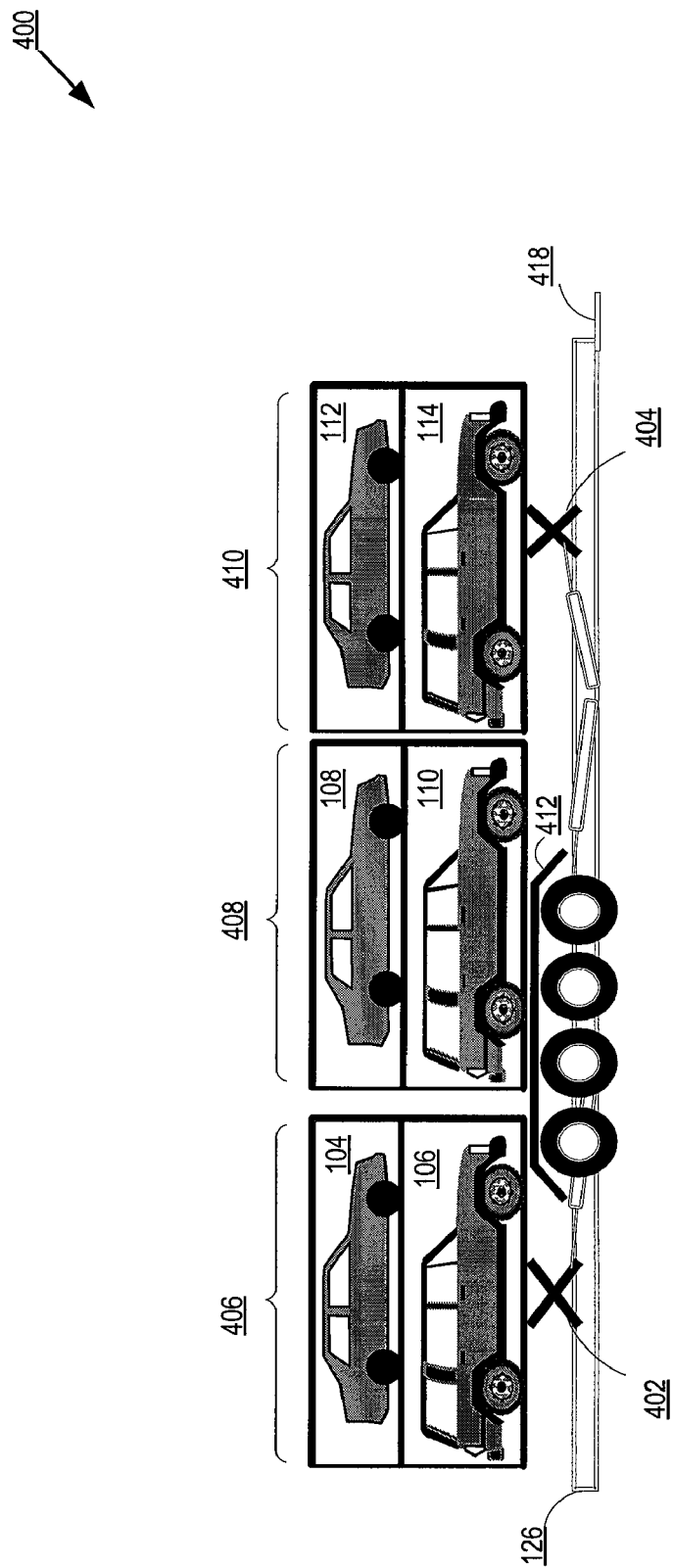
FIG. 4 illustrates a transporter main frame beam assembly and a vehicle compartment lift, separation and rotation assembly of a vehicle transporter.

Referring briefly to FIG. 4, an upper vehicle compartment and a lower vehicle compartment located below the upper vehicle compartment (e.g., 104 and 106, 108 and 110, 112 and 114, and 116 and 118) may be joined to form a vehicle module (e.g., 406, 408 and 410). Vehicle modules may be lifted/lowered, separated/joined from/to adjoining vehicle modules and rotated as a unit. Lockdown and interlocking of the vehicle modules and vehicle compartments contributes to safety and improves the ride quality.

Returning to FIG. 1, the vehicle compartment lift, separation and rotation assembly 124 (e.g., a first vehicle compartment lift, separation and rotation assembly) may position vehicle modules so that the upper vehicle compartments (e.g., 104, 108, 112, 116 and 120) are positioned to the height of an upper vehicle compartment level dock 132 and the lower vehicle compartments (e.g., 106, 110, 114, and 118) are positioned to the height of a lower vehicle compartment level dock 134 for loading/unloading driver occupied passenger vehicles. In another implementation, a second vehicle compartment lift, separation and rotation assembly connected to the vehicle transporter main frame beam assembly (e.g., 126 and 128) and transporter cab beam assembly (e.g., 130) of the transporter positions vehicle modules so that the upper and lower vehicle compartments are positioned to the height of the upper and lower vehicle compartment level docks (e.g., 132 and 134), respectively, for loading/unloading driver occupied passenger vehicles. In still another implementation, the first vehicle compartment lift, separation and rotation assembly positions the upper vehicle compartments to the height of the upper vehicle compartment level dock 132 and the second vehicle compartment lift, separation and rotation assembly positions the lower vehicle compartments, to the height of the lower vehicle compartment level dock 134, in order to divide the lift, separation and rotation operation respectively.

The transporter frame structure is configured so that vehicle compartments may be carried, as low to the ground as possible, to allow for the greatest amount of compartment interior height in order to accommodate large vehicles, while also allowing for adequate clearance for highway bridges, signs and other overhead height limitations. In one implementation, the modules are carried at a level below the height of the wheels and fenders of the transporter. In one implementation, Autobus transporter wheel assemblies, brakes, wheel suspension systems and suspension elements allow for in-line single wheel assemblies (e.g., 136 and 138). In-line single wheel assemblies minimize the horizontal space of the transporter devoted to the wheel assemblies and maximize the amount of interior width available in the vehicle compartments. Autobus transporter single wheel assemblies may be mounted outboard on a main frame beam assembly and the outboard wheel and suspension elements, so that the vehicle compartments may be carried low and between the outboard wheel and suspension elements of the Autobus transporter while allowing the Autobus transporter to remain within prevalent highway vehicle width limits. Autobus transporters may include suspension systems logic that monitors the suspension system to minimize impulse stress loads on overpasses and bridges as the transporters travel on the overpasses and bridges. Autobus transporter suspension systems logic may communicate impulse stress load information to AFOCS so that the Autobus transporter driver and/or AFOCS automatically adjust travel speeds and/or the suspension settings of the transporter. In one implementation, Autobus personnel remotely located may control the navigation of the Autobus transporter (e.g., a transporter driver may be optionally seated at the transporter controls to over-ride remote control). In another implementation, automated driverless transporter logic is used to control the navigation of the Autobus transporter (e.g., without interaction from Autobus personnel remotely located and/or without a transporter driver optionally seated at the transporter controls) and the automated driverless transporter logic may work in communication with other systems (e.g., AFOCS) to safely navigate the transporter.

In one implementation, Autobus transporters are designed to minimize the weight of the transporter in order to permit higher maximum weight loads of larger passenger vehicles (e.g., light trucks, SUVs, vans), client vehicle fuel and client vehicle drivers and passengers. Autobus transporters are configured for a loaded system that includes the aggregate weight of the transporter, client vehicles, client vehicle fuel, and client passengers. The loaded system of an Autobus transporter may weigh less than a maximum gross vehicle weight (e.g., 80,000 pounds gross vehicle weight). By minimizing average transporter gross trip weight to the extent possible, Autobus transporters may be seen by highway engineers and maintenance engineers as moderate weight highway vehicles (e.g., 60,000 to 66,000 pound loaded trip weight).

Autobus transporters include passenger safety and escape mechanisms that activate in the event of a crash and/or other emergency. For example, the Autobus passenger safety and escape mechanisms may include a vehicle compartment emergency fire suppression system and airbag systems (e.g., transporter to client vehicle airbag systems that activate the client vehicle airbags). AFOCS may deploy the passenger safety and escape mechanisms to surround the entire client vehicle in the event of a threshold impact to the transporter and/or vehicle compartment. Autobus transporters may operate to unload client vehicles using an Autobus transporter pairing configuration. For example, a first transport may be aligned with a second transport (e.g., a disabled transport) using AFOC, AEGPS and other Autobus systems and sensors, so that the first transporter may be used to unload the second transporter (e.g., in the event of a transporter on-highway break down). The vehicle compartment sensors in communication with AFOC, AEGPS and/or load/unload ramp and bridge logic may automatically open and/or release the vehicle compartment side panels so that the vehicle passenger and/or client vehicle can safely and quickly exit the vehicle compartment. In another example, an empty first transporter may be positioned tail to tail with a second loaded transporter so that the first transporter may be used to unload client vehicles from the second disabled transporter (e.g., in the event of a transporter on-highway break down). The transporter side panels may automatically be released in order to facilitate rapid and effective egress of client vehicle passengers in the event of transporter overturn, fire, or other emergency requiring rapid evacuation of persons aboard the transporter.

Autobus transporters are more fuel efficient for the same distance of travel by the number of client vehicles that could be transported by an Autobus transporter (e.g., a 9 to 1 ratio and/or higher ratio of driver occupied vehicles to one transporter). Autobus may also offer significant transport energy savings as compared to conventional passenger vehicle traffic and as compared to alternative transport systems. Autobus may be implemented in alternative configurations that allow the system to operate without the use of fossil petroleum-based fuels. Autobus further offers the ability to significantly reduce transportation-related air pollution and greenhouse gas emissions as compared to conventional vehicle traffic and as compared to alternative transport systems. Autobus may be implemented in alternative configurations that achieve progressively better overall emissions characteristics.

In one implementation, Autobus operates as a "near zero" emissions transportation system (e.g., a grid electricity-powered transportation system), achieving reductions of the air pollutants nitrous oxides ($NO_x$), carbon monoxide (CO), and hydrocarbons (HC) in the approximate proportions of 96.4%, 96.9%, and 97.6% reductions, respectively, when compared to conventional passenger car traffic. With regard to the greenhouse gas $CO_2$, Autobus, in the "near zero" configuration, achieves comparative emission reduction of approximately 99.8%. Similarly, Autobus may achieve near zero emissions of the particulate air pollution products known as $PM_{10}$ and $PM_{2.5}$.

Autobus transporters may produce significantly lower amounts of pollution, even with conventional diesel engines and conventional diesel fuel. For example, a diesel-fueled Autobus transporter may avoid tons of automobile-produced $CO_2$ annually. Grid electricity-powered Autobus may be almost completely emissions free and avoid the production of hundreds of tons of $CO_2$ per year per transporter. Grid electricity powered Autobus transporters may draw transportation motive energy generated at central electric power plants and transmitted over the electricity grid to wires aligned with the Autobus served roadway segment. Transfer of electric energy to the Autobus transporters may be accomplished through a pantograph device that transfers electric current from an overhead wire to electric drive motors aboard moving Autobus transporters.

Autobus transporters may be powered by a variety of power systems that use conventional diesel fuels and/or alternative energy systems (e.g., 1) renewable source bio-diesel fuel, 2) domestically produced compressed natural gas, 3) hybrid diesel-electric, and 4) grid electricity power). For example, transporters may use electric power delivered by a high-speed pantograph subsystem from the electric power grid. The high-speed pantograph subsystem may use one or more overhead lines to deliver electric current to an Autobus transporter and one or more overhead lines to ground the Autobus transporter electric motive power circuits (e.g., roadway transporters configured with rubber tires that function as insulators).

Autobus may reduce energy consumed by 60% with the use of conventional diesel engines and diesel fuel, when compared to the number of vehicles transported by Autobus that would otherwise conduct individual equivalent trips over a served roadway segment. For example, Autobus transporters using diesel engines and diesel fuel may consume in BTU's of energy the equivalent of 3.5 standard passenger cars for the same distance traveled, so that transporters deployed with the capacity to transport as many as 9 client vehicles may reduce the energy consumed by 60%.

In one implementation, Autobus transporters may use bio-diesel fuel. Bio-diesel fuel may be domestically produced, may be renewable and does not contribute to global warming. In one implementation, Autobus transporters use natural gas-fueled fueled from domestic sources. In one implementation, Autobus transporters use hybrid diesel-electric power systems that use less fuel than conventional diesel power systems. In one implementation, Autobus transporters use grid electricity generated with domestic energy sources.

Figure 2:
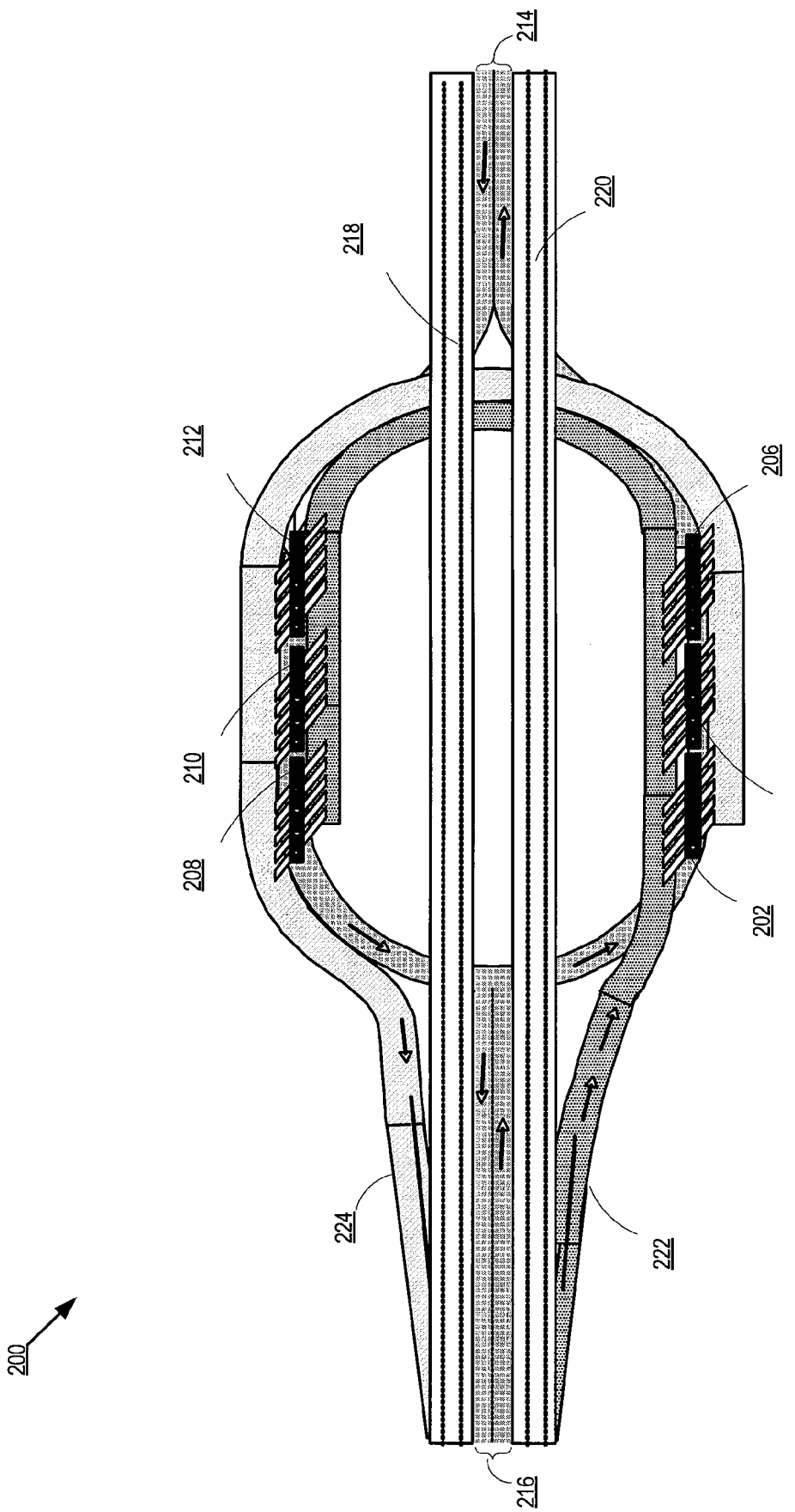
FIG. 2 illustrates an Autobus terminal configuration.

FIG. 2 illustrates an Autobus terminal configuration 200. Autobus terminals 200 may be located on one or both ends of a roadway segment (e.g., the beginning and end of a congested roadway segment, new construction zone roadway segment, severe weather area, emergency incident and special event location). Autobus terminals 200 may be located beyond a served roadway segment (e.g., located on intersecting roads in proximity to multiple destination areas) in order to take advantage of available capacity beyond the congestion zone.

In one implementation, Autobus terminals 200 are located along roadway segments so that transporters operate on unobstructed reserved lanes (e.g., transporter-only lanes). Autobus terminals may be located and configured so that Autobus transporters (e.g., 202, 204, 206, 208, 210, and 212) operate exclusively on the interior lanes (e.g., transporter lanes 214 and 216) of major trunk line highway roadways (e.g., 218 and 220). Autobus terminals 200 may include terminal entrance (load) lane 222 and a terminal exit (unload) lane 224. Autobus terminals 200 and route system (e.g., interior lanes 214 and 216) provide optimum traffic flows because: 1) conventional traffic does not interfere with the high-speed, high-frequency, high traffic volume operation of the transporters; 2) serious traffic disruptions that would occur if transporters were required to change lanes through conventional traffic are avoided; 3) transporters enter and exit Autobus terminals optimally without conventional traffic interference; and 4) transporters and client passenger vehicles operate optimally within Autobus terminals.

Autobus terminals 200 may include multiple transporter docks to accommodate multiple transporters simultaneously loading/unloading passenger vehicles from each transporter. Autobus terminals 200 may include multi-level docks to accommodate simultaneous loading/unloading of multiple transporters (e.g., 202, 204, 206, 208, 210, and 212). In one implementation, the lowest level of the dock is the transporter level where the transporter may be positioned for load/unload operations and where the transporters enter and leave docking facilities, and the second level of the dock may be the level at which load/unload operations for the lower level client vehicle compartments and load/unload ramps are conducted. In another example, a first level of the dock may be the transporter level where the transporter is positioned so that vehicles may load and unload on the lower unload/load docks. The second level of the dock may be the unload/load level for transporter upper level vehicle compartments. The third level of the dock may be the load/unload level for transporter upper level vehicle compartments. The number of dock levels for a terminal may depend on the number of vehicle compartments that may be stacked on a transporter (e.g., a three level dock for two vehicle compartments stacked top to bottom of the transporter and a four level dock for three vehicle compartments stacked top to bottom of the transporter).

Autobus terminals 200 may include sensors and communications systems that assess vehicle height, width, length and weight for first time and/or occasional Autobus users. In the event a vehicle is determined to be incompatible with Autobus client vehicle requirements (e.g., height, width, length and/or weight), AFOCS may display a status message on the terminal dynamic sign system and/or audibly communicate a message that directs the driver to exit the Autobus terminal. AFOCS may prevent an incompatible vehicle from navigating to and/or attempting to board a vehicle compartment. First time and/or occasional Autobus users may also be directed to a particular toll booth to pay the toll and provide the destination information to the toll operator and/or the toll booth. AFOCS then posts dock and compartment assignment on the toll receipt, on signage leaving the toll payment area and on signage in the dock area. In one implementation, AFOCS configures the toll receipt (e.g., RFID imbedded strip and/or smartcard technology) to actuate terminal lane directional aides and appropriate load/unload docks and ramps that permit the client to navigate to particular areas in the terminal (e.g., an assigned dock, an assigned vehicle compartment and assigned transporter). Autobus sensors and/or AEGPS devices actuate the appropriate load/unload ramps for assigned vehicles in order to eliminate the possibility of vehicles entering an unassigned dock.

A vehicle entering an Autobus terminal entrance 222 may navigate past automated sensors and communications systems that determine the trip status of the entering vehicle. For example, in the event the client vehicle is a regular user (e.g., subscriber to Autobus) and an AEGPS device (e.g., handheld) is located in the client vehicle, the AEGPS device may automatically transmit: 1) vehicle height, width, length, weight and wheel base data; 2) trip plan information; and 3) toll payment account information to the AFOCS for automated toll payment. AEGPS may also transmit toll payment data to the toll payment system for automated toll payment. In one implementation, Autobus may receive vehicle identification number, vehicle registration and license plate number information provided by client vehicle drivers to determine vehicle height, width, length, weight and wheel base from general automotive manufacturers' databases. In one implementation, a personal data assistant (PDA) and/or mobile communications device with geo-position system (GPS) capabilities and configured with AEGPS logic may be used as an AEGPS device. For example, a client vehicle driver may download AEGPS logic to a PDA and/or mobile communications device in order to subscribe to and use the Autobus system.

In the event a client vehicle driver has not entered trip plan information into an AEGPS device, the driver may be directed to a toll booth to enter destination information and/or notified to communicate the destination information to AEGPS (e.g., using an AEGPS handheld, a PDA and/or other communication device). Trip plan information may be used by AFOCS to assign the client vehicle to a specific dock, transporter, vehicle module and/or vehicle compartment appropriate for the planned trip. Vehicle weight, height and length information may be used to assign the client vehicle to a specific compartment on the transporter in order to optimize transporter load dynamics, ride comfort, trip safety and avoid transporter weight overloading. The AEGPS device and/or other Autobus terminal sensors communicate in order to actuate terminal lane directional aides (e.g., gates, roadway guides and/or barriers) that allow the client to navigate the vehicle to particular areas in the terminal (e.g., an assigned ramp and dock).

A client vehicle navigates to an assigned load/unload dock in front of an assigned load ramp (e.g., using terminal lane directional aides), where the load ramp barrier and bridge (e.g., 318, 320, 322, 324 and 326) are raised until the client vehicle is permitted to enter the vehicle compartment. Autobus control systems (e.g., a re-configure transporter and modules systems—RTM) may include RTM load/unload ramp and bridge logic that receives a load request message (e.g., driver-initiated and/or from the AEGPS and/or toll receipt RFID) and AFOCS-confirmed acknowledgement message that activates the lowering of the load ramp barrier and extends the bridge so that the client vehicle may enter the vehicle compartment. In one implementation, once the RTM load/unload ramp and bridge logic receives the load request message and AFOCS-confirmed acknowledgement message, the RTM load/unload ramp and bridge logic may communicate a safe-to-enter message to the Autobus transporter driver so that the Autobus transporter driver may activate the lowering of the load ramp barrier and extend the bridge so that the client vehicle may enter the vehicle compartment. The front and rear ramp and bridge assemblies may also serve as front and rear vehicle compartment doors. Ramp and bridge assemblies may also be connected to the load and unload sides of a terminal dock.

In one implementation, while a client vehicle is on the load ramp and prior to entering the vehicle compartment, pressure sensors and/or other Autobus sensors may work together to communicate client vehicle wheel base length and wheel track width information to the RTM vehicle wheel lock logic. In one implementation, a pressure sensor subsystem transmits wheel base and track width dimensions to the Autobus client vehicle guide assembly and Autobus client vehicle anchor module (e.g., vehicle wheel lock logic). In another implementation, pressure sensors and/or other Autobus sensors may be located throughout the Autobus terminal to sense and communicate client vehicle wheel base length and wheel track width information to the RTM vehicle wheel lock logic prior to a client vehicle navigating to the load ramp and prior to entering the vehicle compartment. The vehicle wheel lock logic may instruct RTM to position the guide track assembly of the vehicle compartment to accommodate the client vehicle track width and preposition the vehicle anchor module to the proper distance from the front of the guide track assembly.

Figure 3:
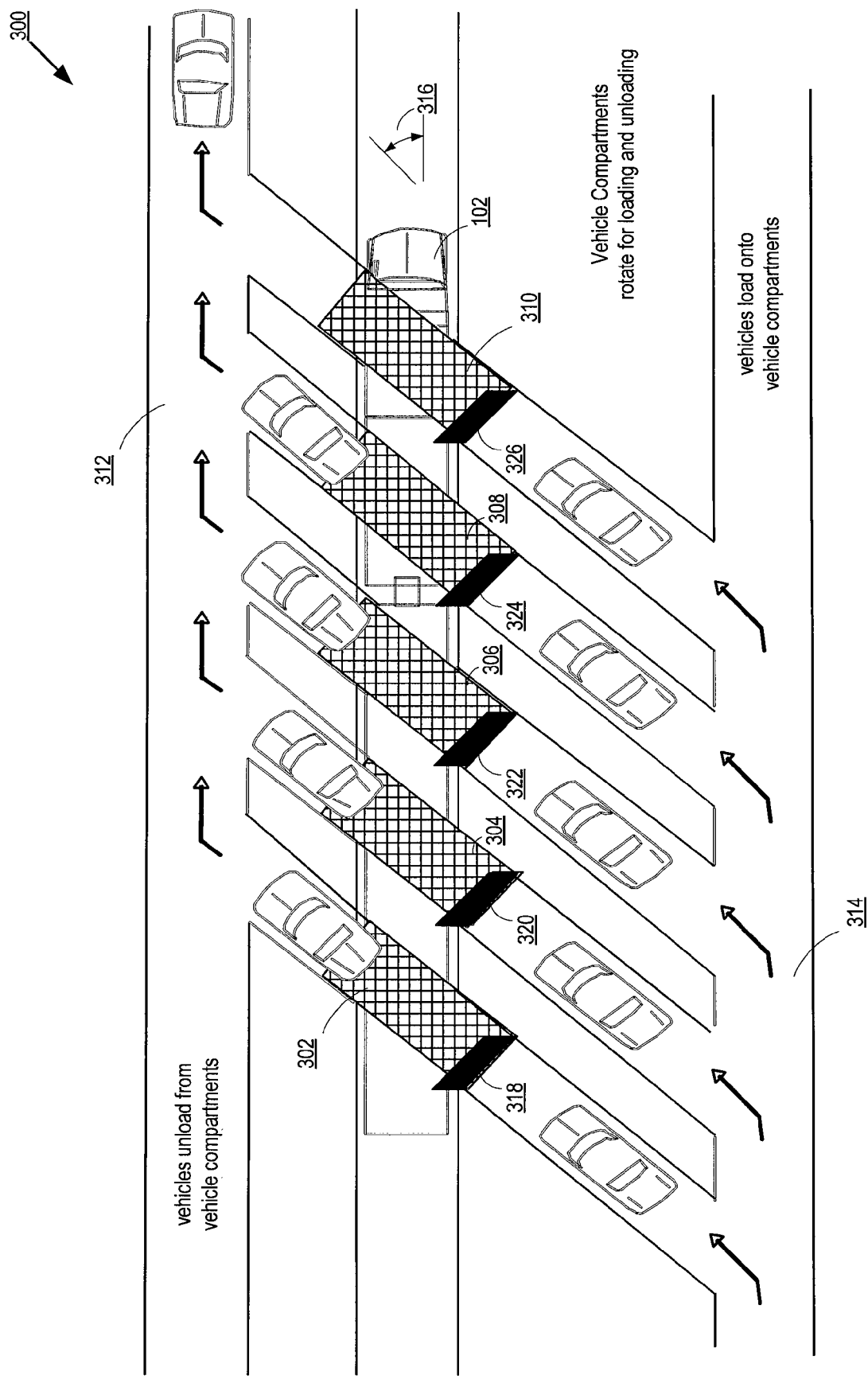
FIG. 3 illustrates loading and unloading vehicle compartments.

FIG. 3 illustrates loading and unloading vehicle compartments configuration 300. Autobus transporter vehicle compartments (e.g., 302, 304, 306, 308, and 310) enable simultaneous unloading of client vehicles from the vehicle compartments, followed by simultaneous loading of client vehicles that are waiting to board the transporter. Client vehicle drivers exit vehicle compartments onto terminal exit (unload) lanes 312. Boarding client vehicle drivers enter into assigned vehicle compartments from terminal entrance (load) lanes 314. The vehicle compartments may be rotated to a shallow angle 316 (e.g., less than 45-degree and/or approximately 22.5-degree) transverse to the long axis of the transporter when the transporter is in the dock and in load/unload position. The shallow angle 316 supports loading and unloading smooth flow of inbound and outbound Autobus client vehicles and may allow more than one client vehicle in each load ramp when necessary.

Autobus transporter drivers navigate transporters to designated terminal docks and stop the transporter 102 when the transporter front tires enter positioning detents. The positioning detents and tire guides located in the transporter lanes of the Autobus terminal assist the transporter driver to position the transporter both laterally and longitudinally for unload/load operations. In one implementation, the transporter driver activates the vehicle compartment lift, separation and rotation assembly from the transporter instrument and control panel. In another implementation, when the transporter is in proper load/unload position in the terminal dock, Autobus automatically activates the vehicle compartment lift, separation and rotation assembly.

Autobus transporter drivers may position transporters 102 in an unload/load dock (e.g., unload/load dock position) using front wheel detent stops that notify the driver when to stop. Once the transporter 102 is in the unload/load dock position, the transporter driver may activate control systems (e.g., a re-configure transporter and vehicle modules systems—RTM) that re-configure the transporter 102, the vehicle modules (e.g., 406, 408 and 410) and vehicle compartments for unload/load operations. RTM may include module lift logic that instructs RTM to lift the vehicle modules and/or lower level vehicle compartments to a height sufficient to clear the wheels and fenders of the transporter. The RTM module lift logic may lift the vehicle modules to a height at which the floors of the lower and upper vehicle compartments are at the levels of the lower and upper unload/load ramps, respectively. Once the vehicle modules and/or vehicle compartments are lifted to the appropriate height, RTM module separation logic instructs RTM to separate the vehicle modules from one another so that the modules may be rotated without obstructing one module by another module. Module rotation logic may then instruct RTM to rotate the modules to a shallow angle transverse to the long axis of the transporter that aligns the modules with the shallow transverse angle of the load and unload ramps. The module lift logic, module separation logic and module rotation logic may automatically receive height information (e.g., module, wheels and fenders of the transporter and docks), separation information and rotation information from AEGPS, AFOCS, other Autobus systems, and/or the transporter operator. In one implementation, Autobus uses multimedia sensors (e.g., environmental sensors and video sensors) to communicate height information, separation information and rotation information and real-time terminal, transporter and module information to the module lift logic, module separation logic and module rotation logic.

Once vehicle module rotation has completed, vehicle compartments are in position for client vehicles to enter and exit the vehicle compartments. RTM load/unload ramp and bridge logic may receive an unload request message (e.g., driver-initiated and/or from the AEGPS and/or toll receipt RFID) and AFOCS-confirmed acknowledgement message that activates the unload ramp and bridge to bridge the gap between the dock exit ramp and the Autobus vehicle compartment. RTM load/unload ramp and bridge logic may also instruct RTM to position and/or maintain the entry end of the vehicle compartment in the raised and blocking position so that vehicles cannot enter the vehicle compartments when RTM load/unload ramp and bridge logic receives the unload request message and AFOCS-confirmed acknowledgement message. Vehicle wheel lock logic may receive the unload request message and AFOCS-confirmed acknowledgement message and disengage the client vehicle locking modules from the inner wheel cavity locking position of the client vehicle wheels. RTM, AFOCS and/or Autobus may notify the client to safely exit the vehicle compartment (e.g., display a green "EXIT NOW" sign and/or audio message) when the module lift logic, module separation logic, module rotation logic, RTM load/unload ramp and bridge logic and vehicle wheel lock logic communicate a safe-to-exit message to RTM.

RTM, AFOCS and/or Autobus logic may use vehicle compartment sensors to detect client vehicle engine status (e.g., client vehicle engine is running) and communicate a message to the client vehicle driver to turn the client vehicle engine off before transport. RTM, AFOCS and/or Autobus logic may communicate the client vehicle engine status to the Autobus transporter driver so that the Autobus transporter driver may assess whether to communicate with the client vehicle driver and/or initiate load/unload commands to the RTM from the transporter control console.

The Autobus transporter driver may initiate load/unload commands to the RTM from the transporter control console. Once the Autobus transporter driver and/or RTM determine that a vehicle compartment is available for a client vehicle entry, the unload ramp barrier and bridge raises into blocking position and the load ramp barrier and bridge lowers into loading position. A green "ENTER NOW" message may notify the client vehicle driver to drive the vehicle into the transporter compartment to the point at which the client vehicle front wheels enter the positioning detent that properly positions the client vehicle lengthwise within the compartment. When the client vehicle has fully entered the compartment, RTM notifies the client driver to stop (e.g., a "STOP NOW" message may be visually and audibly communicated) the client vehicle driver. The raised and blocking unload ramp-bridge and barrier prevents the client vehicle from moving forward beyond a designated position within the vehicle compartment.

The RTM logic and/or Autobus transporter driver determines that the transporter is in transporter trip configuration (e.g., the vehicle compartments are ready for transport), once the vehicle wheel lock logic instructs RTM to actuate client vehicle anchor modules to lock the client vehicle wheels to the floor of the vehicle compartment. The client vehicle anchor modules securely lock to the client vehicle inner wheel rims. The vehicle compartments are rotated into alignment with the long axis of the transporter, brought to adjoining positions and lowered onto the transporter frame. The vehicle compartments are securely locked to the transporter frame and adjacent vehicle compartments are locked to one another.

FIG. 4 illustrates a transporter main frame beam assembly 126 and vehicle compartment lift, separation and rotation assembly (e.g., 402 and 404) of a vehicle transporter. In one implementation, the vehicle compartment lift, separation and rotation assembly 124 connected to the overhead lift beam assembly and a second vehicle compartment lift, separation and rotation assembly (e.g., 402 and 404) connected to the vehicle transporter main frame beam assembly (e.g., 126 and 128) and transporter cab beam assembly (e.g., 130) employ hydraulic, pneumatic, electric motor and/or other systems to lift, separate and rotate vehicle compartments (e.g., 104, 106, 108, 110, 112 and 114) and vehicle modules (e.g., 406, 408 and 410). The first and the second vehicle compartment lift, separation and rotation assemblies may individually and/or in combination position the vehicle modules and vehicle compartments to a height above the wheels and fender of the transporter (e.g., 412) and the position of the upper and lower vehicle compartment level docks (e.g., 132 and 134) so that the vehicle compartments may be loaded and unloaded.

In one implementation, each vehicle module (e.g., 406, 408 and 410) includes: an upper compartment and a lower vehicle compartment located below the upper vehicle compartment; a vehicle module deck designated the floor of the vehicle module and the lower vehicle compartment; a vehicle module roof designated the ceiling of the vehicle module and upper vehicle compartment, wherein the vehicle roof module comprises a left side and a right side of the vehicle roof module; a vehicle module vehicle compartment separator designated the roof of the lower vehicle compartment and the floor of the upper vehicle compartment, wherein the vehicle module vehicle compartment separator comprises a left side and a right side of the vehicle module vehicle compartment separator; a lower load ramp barrier assembly and an upper load ramp barrier assembly designated the rear of the lower vehicle compartment and upper vehicle compartment, respectively; a lower unload ramp barrier assembly and an upper unload ramp barrier assembly designated the front of the lower vehicle compartment and upper vehicle compartment, respectively; and a driver side vehicle module panel and a passenger side vehicle module panel, wherein the driver side vehicle module panel and the passenger side vehicle module panel each have a forward edge connected to the unload ramp barrier assemblies and a rear edge connect to the load ramp barrier assemblies.

In one implementation, lower vehicle compartments may be configured as large-vehicle compartments to accommodate light trucks and SUVs. Light trucks and SUVs may require higher roof dimensions to accommodate the higher profiles of these vehicles. Large vehicles placed in lower vehicle compartments lower the transporter center of gravity and improve transporter road dynamics and stability. Upper vehicle compartments may accommodate lower height, standard sedans.

Figure 5:
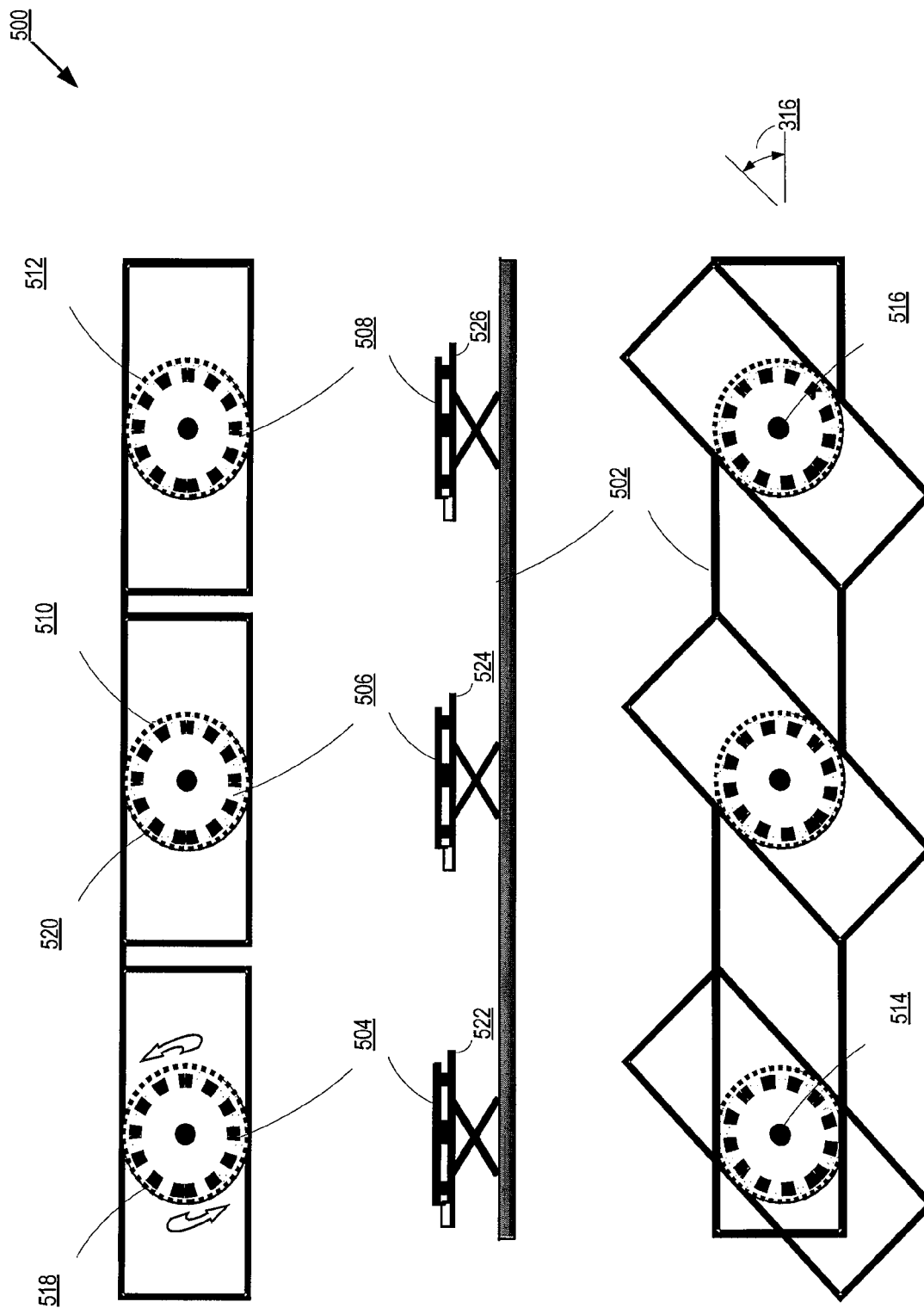
FIG. 5 illustrates a beam assembly and vehicle compartment lift, separation and rotation assembly.

FIG. 5 illustrates a beam assembly and vehicle compartment lift, separation and rotation assembly 500. The beam assembly 502 may be configured as the vehicle transporter main frame beam assembly (e.g., 126 and 128), transporter cab beam assembly (e.g., 130) of the transporter and the overhead lift beam assembly 122. In other words, the beam assembly 502 may be configured as the overhead lift beam assembly 122 and connect to the terminal dock ceiling, configured as the vehicle transporter main frame beam assembly (e.g., 126 and 128) connected to the transporter, and configured as the transporter cab beam assembly (e.g., 130) connected to the transporter cab. The vehicle compartment lift, separation and rotation assembly (e.g., 124, 402 and 404) may include any number of lift, separation and rotation assembly sub-assemblies (e.g., 504, 506 and 508) needed to individually lift, separate and rotate a desired number of vehicle compartments. In one implementation, the lift, separation and rotation assembly sub-assemblies (e.g., 504, 506 and 508) include toothed rotating plates (e.g., 510, and 512) that are connected to the beam assembly 502 by rotating plate hubs (e.g., 514 and 516), and the toothed rotating plates may rotate against rotating plate roller bearings (e.g., 518 and 520). The rotating plate roller bearings (e.g., 518 and 520) may rotate against a lift support plates (e.g., 522, 524 and 526).

In one implementation, rotation of the vehicle compartment occurs subsequent to: a) separation of the vehicle modules (e.g., 406, 408 and 410) to enable rotation; and b) lifting of the vehicle modules above the height of the transporter wheel assemblies 412. The vehicle compartments (e.g., 104, 106, 108, 110, 112 and 114) rotate into a terminal dock load and unload position. When rotation completes the unload ramp and bridge assembly lowers and client vehicles simultaneously exit vehicle compartments. When vehicle compartments are ready for loading a client vehicle, the unload ramp and bridge assembly is raised into an upright blocking position and the load ramp and bridge assembly lowers so that client vehicles may load the vehicle compartments.

Figure 6:
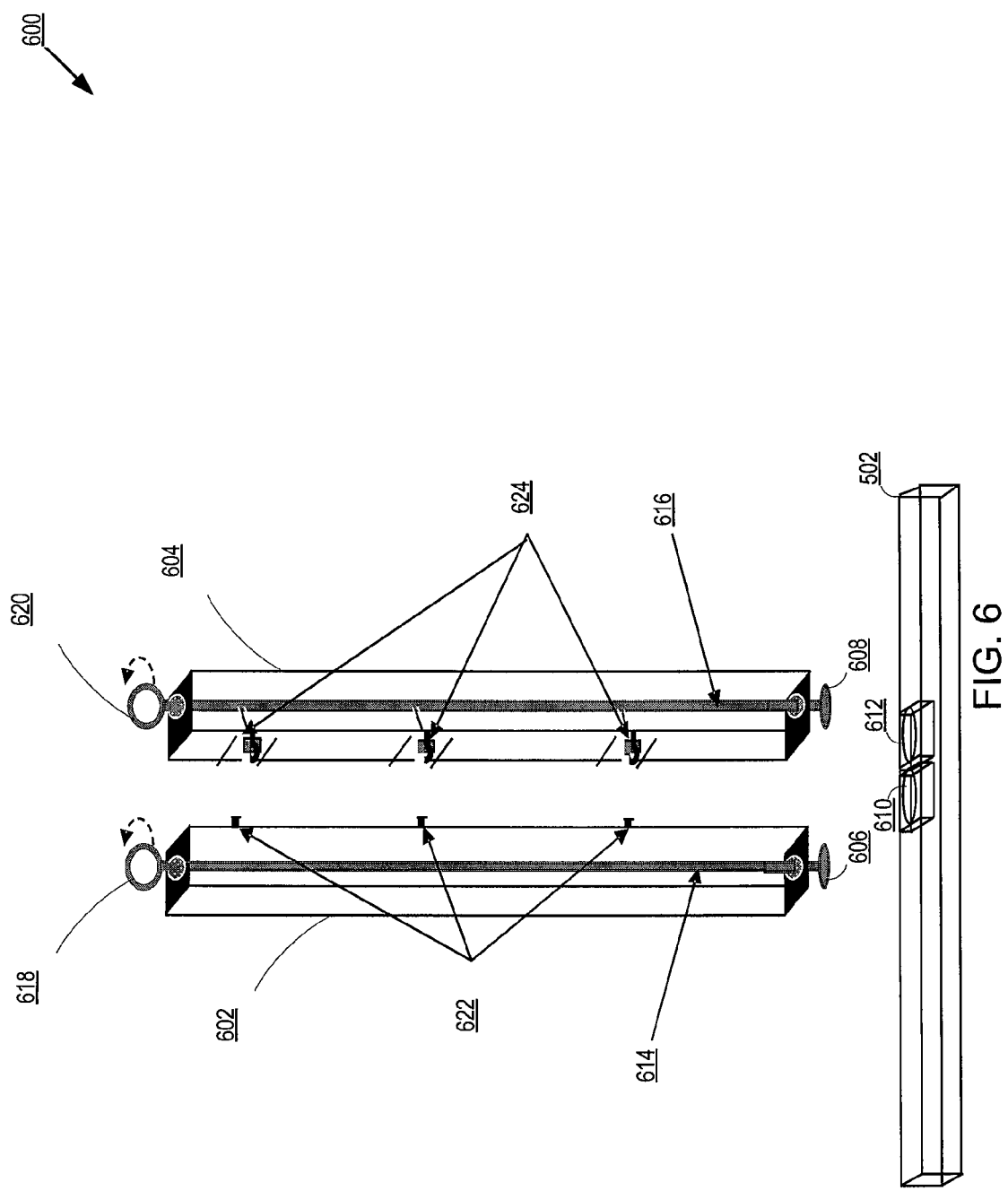
FIG. 6 illustrates a vehicle compartment locking and unlocking configuration.

FIG. 6 illustrates a vehicle compartment locking and unlocking configuration 600. Configuration 600 shows vertical frame ribs (e.g., 602 and 604) of vehicle compartments (e.g., 104 and 108, 106 and 110, and 112 and 114) and/or vehicle modules (e.g., 406, 408 and 410). In one implementation, each vehicle module (e.g., 406, 408 and 410) includes: a vehicle module frame comprising the vertical frame ribs (e.g., 602 and 604), wherein the vehicle module deck, the vehicle module roof, the driver side vehicle module panel, the passenger side vehicle module panel, the lower and upper load ramp barrier assemblies, and the lower and upper unload ramp barrier assemblies are connected to the vehicle module frame. In one implementation the vertical frame ribs (e.g., 602 and 604) of each vehicle module include: a front left side vertical frame rib that is connected to the lower and upper unload ramp barrier assemblies and the driver side vehicle module panel; a front right side vertical frame rib that is connected to the unload ramp barrier assembly and the passenger side vehicle module panel; a rear right side vertical frame rib that is connected to the lower and upper load ramp barrier assemblies and the passenger side vehicle module panel; and a rear left side vertical frame rib that is connected to the lower and upper load ramp barrier assemblies and the driver side vehicle module panel.

In one implementation, each vehicle compartment includes: a vehicle compartment frame comprising vertical frame ribs (e.g., 602 and 604), wherein the deck, the roof, the driver side panel, the passenger side panel, the load ramp barrier assembly, and the unload ramp barrier assembly are connected to the vehicle compartment frame. The vertical frame ribs (e.g., 602 and 604) may include: a front left side vertical frame rib that is connected to the unload ramp barrier assembly and the driver side panel; a front right side vertical frame rib that is connected to the unload ramp barrier assembly and the passenger side panel; a rear right side vertical frame rib that is connected to the load ramp barrier assembly and the passenger side panel; and a rear left side vertical frame rib that is connected to the load ramp barrier assembly and the driver side panel.

In one implementation, each vertical frame rib (e.g., 602 and 604) includes a vehicle compartment locking foot (e.g., 606 and 608) that corresponds to a vehicle compartment locking foot well (e.g., 610 and 612) located on a corresponding beam assembly 502 configured as the vehicle transporter main frame beam assembly (e.g., 126 and 128) and/or transporter cab beam assembly (e.g., 130) of the transporter. In one implementation, the vertical frame ribs of the upper level vehicle compartments (e.g., 104, 108, 112, and 116) include a vehicle compartment locking foot (e.g., 606 and 608) that corresponds to a vehicle compartment locking foot well (e.g., 610 and 612) located on a corresponding roof of a lower level vehicle compartment (e.g., 106, 110, 114, and 118). The vehicle compartment locking foot wells may be located on the roof of the lower level vehicle compartments (e.g., 106, 110, 114, and 118) on the left side and right side of each roof.

The vertical frame ribs (e.g., 602 and 604) may include an actuator rod (e.g., 614 and 616) with a lifting ring (e.g., 618 and 620) connected at one end of the actuator rod and a vehicle compartment locking foot (e.g., 606 and 608) connected at the other end of the actuator rod. The vertical frame rib (e.g., 602 and 604) may include locking pins (e.g., 622) and/or finger locks (e.g., 624) used to join adjacent vehicle compartments (e.g., 104 and 108, 106 and 110, and 112 and 114) and/or vehicle modules (e.g., 406, 408 and 410). In one implementation, the vehicle compartment locking foot (e.g., 606 and 608), locking pins (e.g., 622) and/or finger locks (e.g., 624) are actuated by the actuator rod. For example, the actuator rod may be rotated (e.g., 90 degrees) by the lift, separation and rotation assembly which grips and turns the lift ring to lock and unlock vehicle compartment locking foot (e.g., 606 and 608), locking pins (e.g., 622) and/or finger locks. In one implementation, lift, separation and rotation assembly uses hydraulic, pneumatic, and/or electric power to grip and turn the lift ring to lock and unlock vehicle compartment locking foot (e.g., 606 and 608), locking pins (e.g., 622) and/or finger locks.

Module separation logic may actuate the vehicle compartment lift, separation and rotation assembly to actuate the vertical frame ribs, actuator rod, lifting ring and/or locking foot of the vertical frame rib to join and separate vehicle compartments and/or vehicle modules to and from each other, and lock and unlock the lower vehicle compartments to and from the transporter main frame beam assembly (e.g., 126 and 128) and/or transporter cab beam assembly (e.g., 130) of the transporter 102. The module rotation logic actuates the vehicle compartment lift, separation and rotation assembly to rotate the vehicle compartments into position to load and unload the vehicle compartments, join and separate the vehicle compartments adjacent to each other, and lock and unlock the lower vehicle compartments to and from the transporter main frame beam assembly (e.g., 126 and 128) and/or transporter cab beam assembly (e.g., 130) of the transporter.

Figure 7:
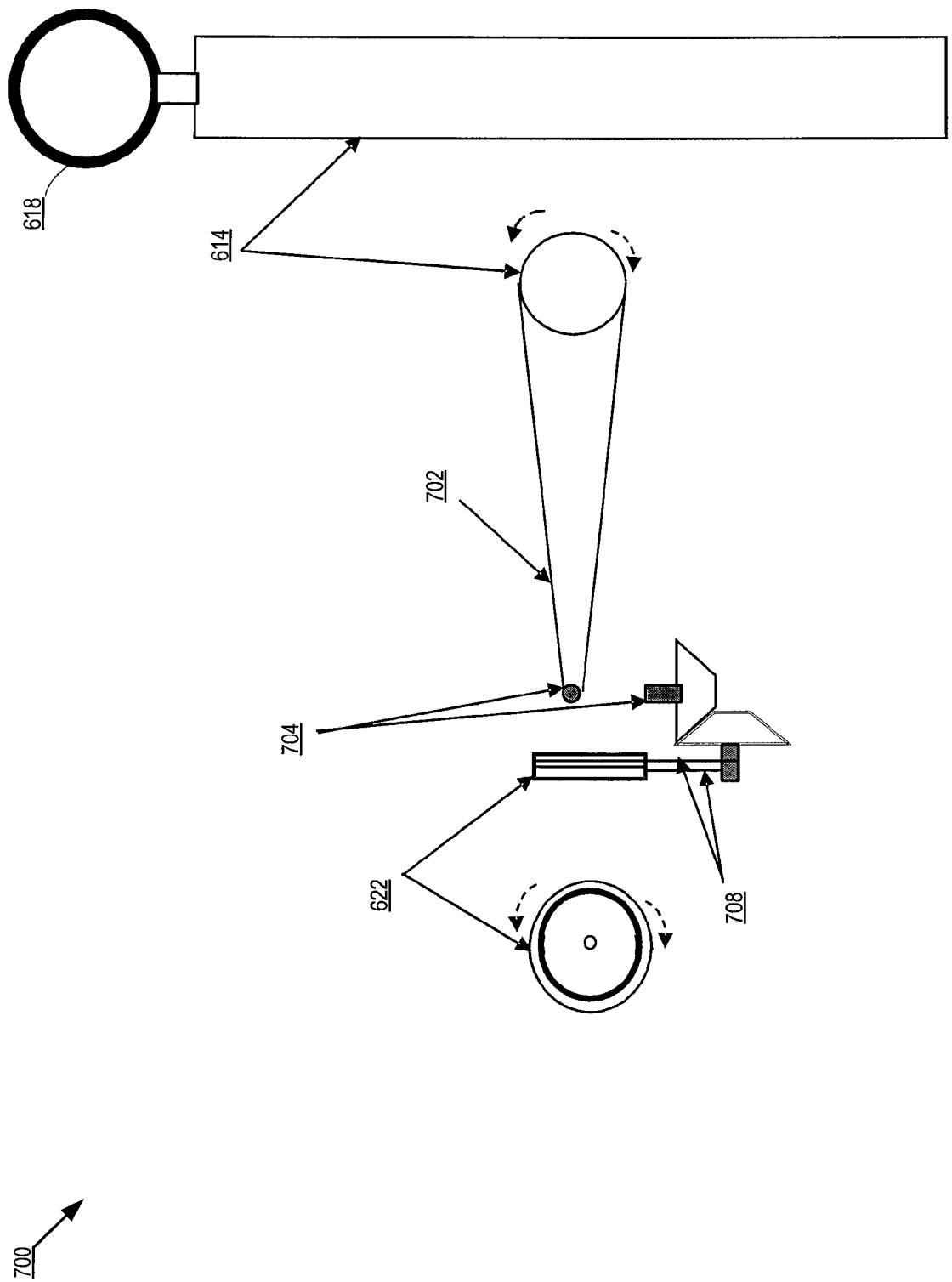
FIG. 7 illustrates a vertical frame rib and an actuator rod assembly.

FIG. 7 illustrates a vertical frame rib and an actuator rod assembly 700. In one implementation, when the lift ring 618 of a vertical frame rib 602 is rotated the actuator rod (e.g., 614) turns a module unlock bevel gear cable 702 that rotates a bevel gear 704. When the bevel gear 704 rotates then lock ring cables 706 rotates the locking pins (e.g., 622) and/or finger locks (e.g., 624).

Figure 8:
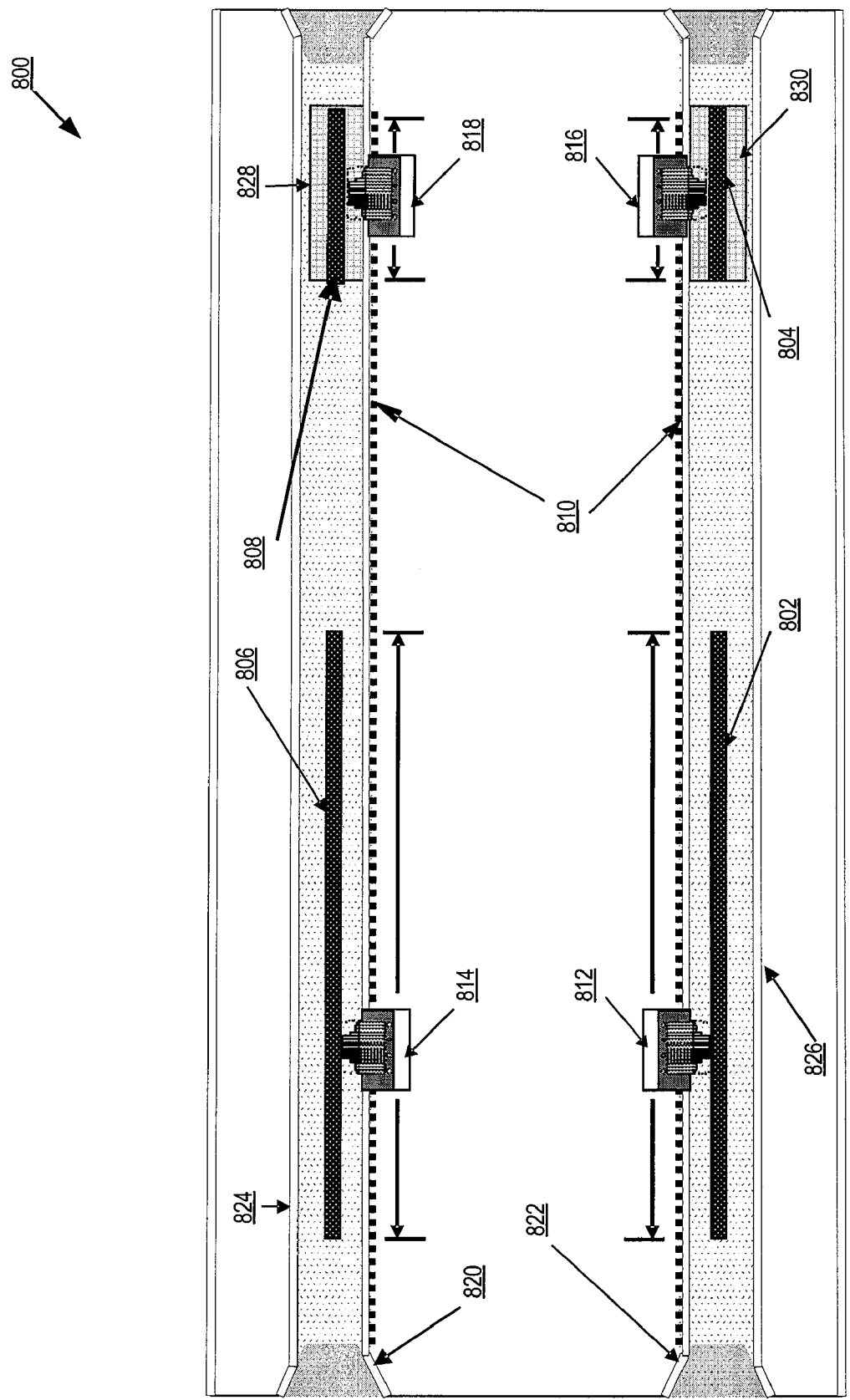
FIG. 8 illustrates the deck of a vehicle compartment.

FIG. 8 illustrates the deck of a vehicle compartment 800. In one implementation, the tire track width of a client vehicle is sensed by track width sensors (e.g., 802, 804, 806 and 808) (e.g., pressure sensors and/or video sensors) mounted in the vehicle compartment. For example, the track width sensors (e.g., 802, 804, 806 and 808) may be located in the loading dock ramp and/or vehicle compartment and communicate tire track width information to a vehicle compartment wheel guide assembly 810. The wheel guide assembly 810 may automatically position wheel anchor modules (e.g., 812, 814, 816 and 818) along the wheel inner guide bars (e.g., 820 and 822) based on the tire track width information. In one implementation, the wheel inner guide bars (e.g., 820 and 822) and wheel outer guide bars (e.g., 824 and 826) include sensors that provide tire track width information to the wheel guide assembly 810. The vehicle compartment may include front wheel stops (e.g., 828 and 830) that notify the client vehicle driver when the vehicle is properly positioned in the vehicle compartment.

Figure 9:
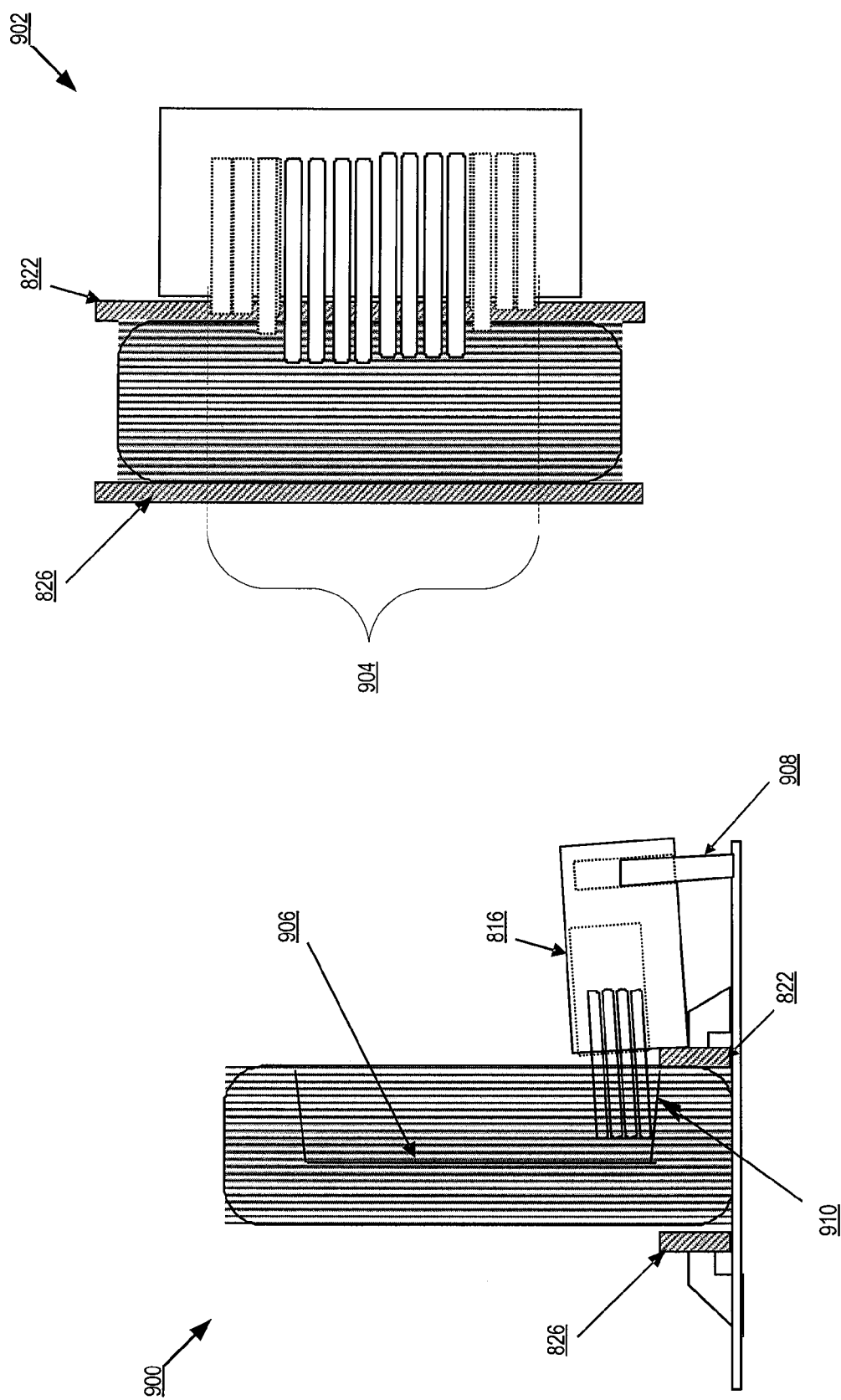
FIG. 9 illustrates an actuated client vehicle wheel anchor module side view and an actuated client vehicle wheel anchor module top view.

FIG. 9 illustrates an actuated client vehicle wheel anchor module side view 900 and an actuated client vehicle wheel anchor module top view 902. The client vehicle wheel anchor module locks and unlocks a client vehicle to and from the deck of a vehicle compartment. In one implementation, the wheel anchor modules (e.g., 812, 814, 816 and 818) include fingers 904 (e.g., high-strength steel) that are moved into the inner wheel concavity 906 of the client vehicle wheels (e.g., using electric, hydraulic, and/or pneumatic systems). The amount of steel finger extension may be controlled by resistance sensors that cause the fingers to stop when the tire surface or the wheel surface is encountered. When the wheel anchor module fingers 904 (e.g., the number of fingers determined to be sufficient to secure the vehicle wheel may be configurable) have reached maximum extension, a wheel anchor module pivot assembly 908 pivots the wheel anchor module (e.g., 812, 814, 816 and 818) in position to lock the wheel anchor module fingers 904 against the lower inside surface 910 of the client vehicle wheel for transport. The wheel anchor module pivot assembly 908 pivots the wheel anchor module into an unlock position, the wheel anchor module fingers 904 retract into the wheel anchor module 816 to release the wheels of the client vehicle from the deck of the vehicle compartment.

Figure 10:
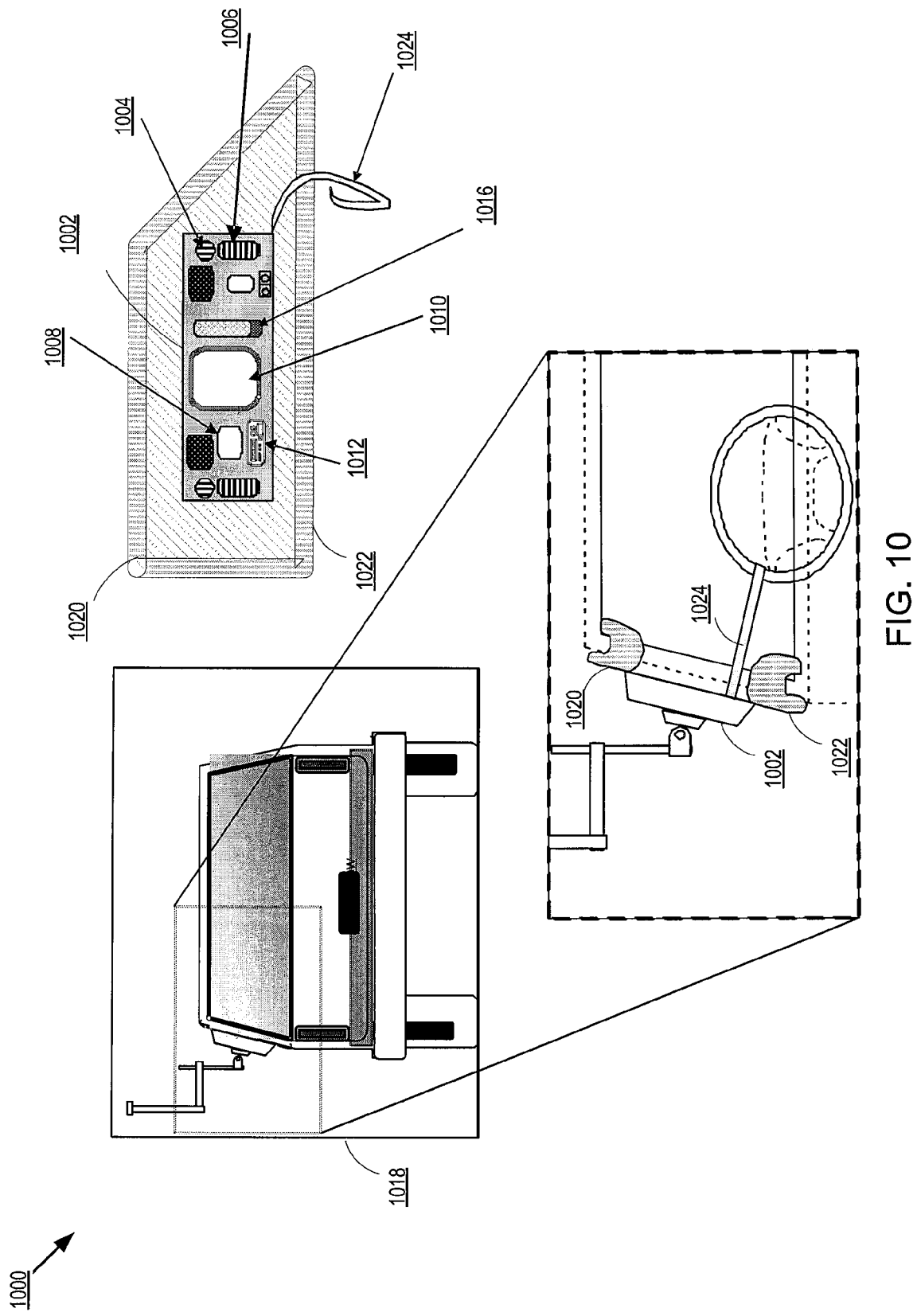
FIG. 10 illustrates an amenities module configuration of the vehicle compartment.

FIG. 10 illustrates an amenities module configuration 1000 of a vehicle compartment. Autobus vehicle compartments may include an Autobus Amenities module (MM) 1002 that provides comfort and convenience to transported drivers and passengers located within the client vehicle. In one implementation, AAM 1002 includes an environmental controls device (e.g., 1004 and 1006) (e.g., air conditioning and/or heat controls and ventilation) to the client vehicle, lighting 1008 to illuminate the interior of the vehicle compartment and client vehicle, personal computing capabilities (e.g., a kiosk and/or graphical display with touch screen capability 1010), multimedia communications (e.g., radio 1012 and intercom 1014 provide communicates between the transporter driver and client vehicle drivers) and access to a network (e.g., the Internet). AAM 1002 provides electrical power 1016 (e.g., electrical power for the electrical and electronic devices such as audio systems, personal computers and PDAs) to a client vehicles so that the power source of the client vehicles (e.g., vehicle battery and/or fuel cells) does not have to be used during Autobus transport. In one implementation, power (e.g., electricity, hydrogen, and natural gas) delivered through the AAM 1002 is used to re-charge and/or refuel the client vehicle power source (e.g., batteries and/or fuel cells) that may be low on power and/or expected to perform poorly because of cold weather or battery deterioration. Re-charging client vehicle power sources (e.g., batteries and/or fuel cells) may help to ensure the availability of sufficient charge to start the client vehicle engine for debarking from the Autobus transporter. AAM 1002 may include multiple graphical displays (e.g., wide screen flat-panel displays) arranged to provide the client vehicle driver selectable views of the roadway segment (e.g., views from cameras mounted at various locations about the vehicle transporter and/or real-time satellite feeds) and/or multimedia programming (e.g., satellite and/or cable television and movies). The client vehicle driver may use the kiosk to enter final trip destination information and AFOCS may determine a forecasted total trip time and alternative final trip routings based on real-time traffic conditions that the kiosk displays to the client vehicle driver.

In one implementation, AAM 1002 may be located on the driver-side wall 1018 of the vehicle compartment in proximity to the client vehicle driver window. In one implementation, the vehicle wheel lock logic instructs RTM to position the AAM 1002 within easy reach of the driver's window, once the client vehicle anchor modules lock the client vehicle wheels to the floor of the vehicle compartment. The client vehicle driver may position the AAM 1002 within the client vehicle driver window. In one implementation, the AAM 1002 includes AAM conformable edge control logic (e.g., pneumatic control logic) and an AAM conformable edge 1020 and 1022 (e.g., pneumatically conformable) that surrounds the AAM 1002 so that the AAM 1002 is conformable (e.g., air tight at ambient pressure) to the client vehicle driver window, client vehicle window frame and/or client vehicle window opening. The AAM control logic may automatically and/or the client vehicle driver may adjust the AAM conformable edge (e.g., 1020 and 1022), in order to conform the AAM 1002 to the client vehicle driver window, client vehicle window frame and/or client vehicle window opening, using AAM controls accessible through AAM 1002 (e.g., kiosk 1010). In one implementation, the vehicle wheel lock logic instructs RTM to maintain the vehicle wheel lock until the AAM is repositioned to a designated position (e.g., un-deployed storage position) within the vehicle compartment in order to prevent the client vehicle from exiting the vehicle compartment before removing the AAM from the client vehicle driver window. The AAM 1002 may include an AAM client vehicle strap 1024 useable to secure the AAM 1002 to the steering wheel of the client vehicle. The AAM client vehicle strap 1024 may be used to further adjust the AAM 1002 to the client vehicle window and provide feedback to the vehicle wheel lock logic and/or RTM in order to maintain the vehicle wheel lock in order to prevent the client vehicle from exiting the vehicle compartment before removing the AAM from the client vehicle driver window.

Figure 11:
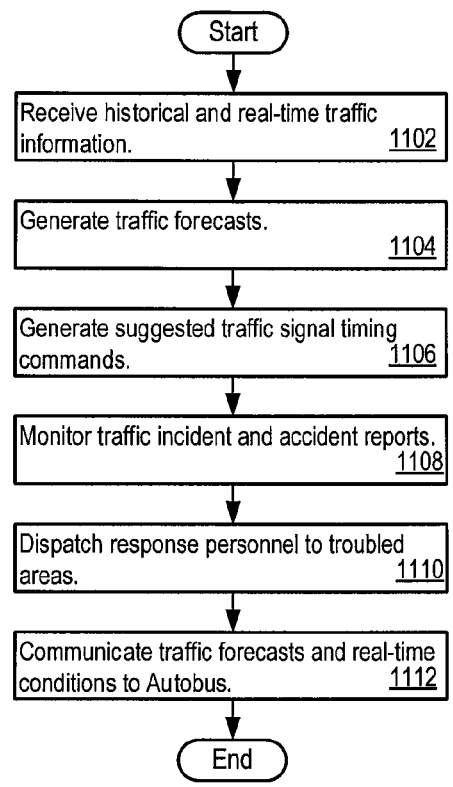
FIG. 11 illustrates the logic flow that may be used to forecast traffic capacity and demand to determine where and when to deploy Autobus.

FIG. 11 illustrates the logic flow 1100 that may be used to forecast traffic capacity and demand to determine where and when to deploy Autobus. A Central Traffic Management System (CTMS) receives historical traffic database, current weather conditions and forecasts, road construction information and special events information (1102). CTMS generates real-time traffic forecasts and maps for traffic control personnel, identifies current and forecasted congestion zones including traffic speeds and the estimated duration of traffic congestion (1104). CTMS generates and communicates suggested traffic signal timing commands to the traffic signal network (1106) and generates and communicates roadway ramp meter timing commands to the roadway ramp meter network for the roadway segments serviced by Autobus. CTMS monitors and identifies traffic information including incidents and overloaded intersections, entry and exit ramps (1108). CTMS receives reports that identify traffic accidents, incidents, traffic flow estimates, and the location and severity of incidents, and dispatches incident management teams and/or public safety personnel to trouble areas (1110). CTMS communicates roadway segment capacity and traffic demands to Autobus in order to utilize Autobus variable capacity (1112). In another implementation, CTMS communicates roadway segment capacity and traffic demands to a metropolitan area traffic management system in order to utilize Autobus variable capacity.

Figure 12:
FIG. 12 illustrates logic flow that may be used to deploy and manage Autobus variable capacity.

FIG. 12 illustrates logic flow 1200 that may be used to deploy and manage Autobus variable capacity. An Autobus system-wide demand forecast (e.g., the fleet of transporters and terminals servicing a particular area and/or region) is generated based on traffic forecasts and probability calculations received from CTMS (1202). Autobus transporters are dispatched to Autobus terminals based on Autobus system demand forecast (1204) and Autobus forecasts are refined based on current and forecasted traffic conditions. The Autobus efficient use toll system is employed to manage and adjust toll rates for roadway segments served by Autobus (1206) to provide incentives and/or disincentives to client vehicle drivers to use and/or not use Autobus transporter capacity. Autobus system demand is modified according to incoming trip reservations from Autobus client vehicles (e.g., AEGPS devices) (1208). Qualifying client vehicle drivers are directed to Autobus terminals that serve current and forecasted congestion zones, using road signage, public broadcasts and AEGPS (1210).

Traffic signal and ramp meter timing commands are generated and communicated to Autobus terminals (1212), in order to minimize traffic congestion at terminals expecting transporters to arrive with client vehicles for unloading and ensure output capacity for client vehicles exiting those Autobus terminals. Roadway ramp meter timing commands are generated and communicated to Autobus terminal exit ramps in order to optimize flow of client vehicles exiting Autobus terminals. Autobus reserve transporters are deployed to roadways with unexpectedly reduced capacity (e.g., accidents, severe weather, special events and new construction zones) (1214). Autobus transporters are directed to alternative terminals for unloading when required (e.g., avoid traffic conditions at and/or around an originally planned destination terminal) (1216). Mobile docking units and appropriate Autobus transporters are dispatched to areas experiencing a shortage of Autobus output capacity and/or input capacity (1218).

Optimum traffic flow through an Autobus-served roadway and/or segment of highway may depend on the following: 1) the number and traffic capacity of Autobus entry terminals located on feeder roads flowing into and out of the Autobus-served roadway segment; 2) the number of traffic lanes of the served segment; 3) the number of lanes on the facility designated for Autobus System use which determines the number of lanes remaining for conventional traffic; 4) the number and uniform speed of the Autobus transporters; 5) the Autobus load factor; 6) the efficiency and precision of Autobus operations on the lane(s) served by Autobus; and 7) conventional traffic inputs (e.g., on-ramps) and outputs (e.g., off-ramps) along the length of the served roadway segment.

Conventional traffic flow in and out of a roadway segment may be controlled by the CTMS and AFOCS in order to optimize traffic flow through roadway and/or segments of highway served by Autobus. For example, in the event non-Autobus lanes become congested over the length of a roadway segment, then the outputs (e.g., cars debarking from Autobus transporters) may be delayed from re-entering downstream conventional traffic lanes and congestion may result. CTMS and/or CTMS personnel may work interactively with AFOCS to control flows onto and off of the served roadway segment to maintain desired roadway capacity at particular locations along the roadway segment, and to improve the out flow rate of client vehicles exiting Autobus terminals.

Figure 13:
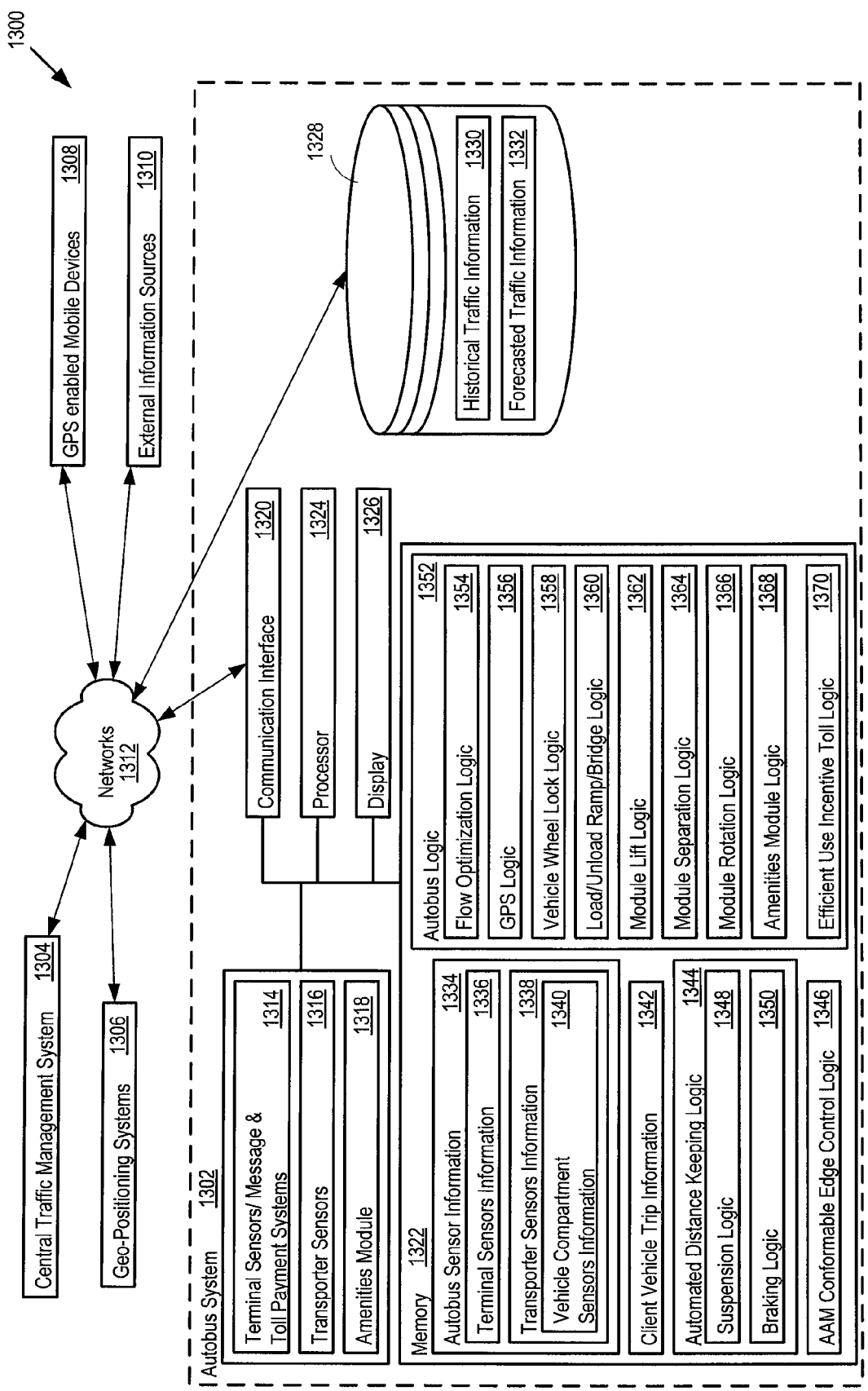
FIG. 13 illustrates an Autobus system configuration.

FIG. 13 illustrates an Autobus system configuration 1300. In one implementation, Autobus system configuration 1300 may include: the Autobus system 1302; a central traffic management system (CTMS) 1304; geo-positioning systems (GPS) 1306 (e.g., satellites, receivers and transmitters); GPS enabled mobile devices 1308; external information sources 1310; and networks 1312 (e.g., the Internet, telephonic and/or broadcast communications networks). In addition to Autobus terminals, transporters, driver occupied drivers and roadway segments served by Autobus system 1302, Autobus system 1302 may include: terminal sensors, message and display systems, and toll payment systems 1314; transporter sensors 1316; and amenities modules 1318. Autobus system 1302 includes a communications interface 1320 used to communicate with the various components of the Autobus system 1302 and the other components within the Autobus system configuration 1300; a memory 1322; a processor 1324; graphical display 1326; and a database 1328. The database 1328 may include historical traffic information 1330 and forecasted traffic information 1332. Memory 1322 may include autobus sensor information 1334, including terminal sensors information 1336; transporter sensors information 1338; and vehicle compartment sensors information 1340. Memory 1322 may further include client vehicle trip information 1342; automated distance keeping system (ADKS) logic 1344; and amenities conformable edge control logic 1346. In one implementation, the automated distance keeping logic 1344 includes suspension logic 1348 and braking logic 1350. In one implementation, memory 1322 further includes Autobus logic 1352 that includes: flow optimization logic (AFOCS) 1354; GPS logic (AEGPS) 1356; vehicle wheel lock logic 1358; and load/unload ramp and bridge logic 1360. The Autobus logic may further include module lift logic 1362; module separation logic 1364; module rotation logic 1366; amenities module logic 1368; and efficient use incentive toll (AEUIT) logic 1370.

In one implementation, CTMS 1304 includes various traffic monitoring and control computer and software systems, various communications systems, traffic databases, an operations staff of expert human traffic controllers, various traffic sensor systems, traffic counting systems, critical area traffic camera systems, and various traffic control systems such as traffic semaphores and roadway ramp metering systems located on the roads and highways. AEGPS may include logic 1356 and a handheld device 1308 that is carried in Autobus client vehicles and/or the AEGPS logic 1356 may be downloaded to a GPS enabled mobile device 1308. Client vehicle trip information may be received by Autobus 1302 using the AEGPS logic 1356 and/or GPS enabled mobile device 1308. The external information sources 1310 may provide Autobus 1302 with information used to identify real-time and forecasted traffic demands and traffic conditions (e.g., weather, special events, new construction zones and emergency incidents).

AFOCS logic 1354 may perform the following functions to maximize the flow of client vehicles aboard Autobus transporters: 1) assign incoming transporters to specific docks within the Autobus terminals in a manner such that transporter traffic flow out of the terminals is optimized; 2) assign incoming client vehicles to specific docks and specific vehicle compartments aboard the transporter, in order to match transporters and entering vehicle destinations and to facilitate optimum client vehicle flows out of the dock and terminal areas; 3) determine the optimum release timing of transporters in a terminal in order to ensure smooth flow into designated Autobus lanes of the served roadway segment; 4) determine the optimum transporter speeds and transporter separations, given ambient driving conditions over the served roadway segments, and controls transporter speeds and separations (e.g., subject to transporter driver intervention and subject to ADKS logic); and 5) report Autobus-transported traffic information to CTMS.

In one implementation, Autobus forecasts traffic demand and controls traffic flows for the most heavily-utilized, main trunk-line highway facilities. Autobus variably increases input capacity by locating Autobus terminals along the various feeder roadways where traffic demand significantly exceeds feeder road capacity. Autobus may designate additional lanes of a served roadway segment for Autobus service by activating roadway signage along the served roadway segment. Autobus transporters may also be directed to alternative exit terminals where adequate outflow capacity exists in order to increase and/or maintain desired roadway segment capacity and traffic outflow capacity from Autobus served highway segments. Traffic inputs from various feeder roads may be matched in real time with the variable sustainable traffic flow capacities of Autobus served highway segments.

In one implementation, capacity sensors detect roadway traffic load and flow information, including: current traffic volume; current traffic average speed; and current traffic average separation. In one implementation, the roadway traffic load and flow information may be provided by various external sources and services. Autobus determines the boarding demand for 1) passenger cars, and 2) SUVs (sports utility vehicles) and light trucks based on historical traffic data and traffic statistics and probabilities, and the roadway traffic load and flow detected by the upstream sensors. Autobus calculates the forecasted rate of boarding (e.g., per minute) for passenger cars, and SUVs and light trucks. The incident reports and/or accident reports, and current weather and forecasted weather conditions are used to adjust the forecasted rate of boarding for passenger cars, and SUVs and light trucks. The number of in-terminal transporters and inbound transporters, and 'flex capacity' load/unload docks are scheduled based on the forecasted rate of boarding, passenger car outflow capacity limits from destination terminal and inbound transporter flow and separation data received from GPS systems (e.g., a transporter tracking system). Commands are released to transporters and loading docks are assigned to incoming transporters. Speed and separation commands are communicated to outbound transporters. Passenger cars board transporters inbound to destination terminals.

In the event demand for an origination terminal (e.g., the number of driver occupied passenger vehicles demanding transport) is greater than the destination terminal capacity, AFOCS may instruct the origination terminal to reduce the number of potential driver occupied passenger vehicles entering the origination terminal. In one implementation, the number of potential driver occupied passenger vehicles entering the origination terminal may be reduced by queuing cars in the origination terminal before boarding transporters in order to mitigate transitory excess demand, and/or waiving off potential driver occupied passenger vehicles from the origination terminal.

In one implementation, terminal exit lanes (e.g., roadway re-entry lanes) traffic signals meter the flow of vehicles debarking from transporters back into traffic downstream of the destination terminal according to real-time traffic conditions in order to achieve optimal downstream traffic flow.

AFOCS provides information to CTMS regarding Autobus demand and utilization (e.g., the number of transported client vehicles currently being transported, the destination terminals and expected time and rate of re-entry into the conventional highway and road system). CTMS uses Autobus demand and utilization information to control intermediate traffic flows into the Autobus served roadway segment and to regulate intermediate inflows in order to ensure that adequate roadway capacity is available to accommodate Autobus outflow traffic. In one implementation, Autobus outflow traffic (e.g., client vehicles exiting an Autobus terminal) is given priority over conventional traffic because the Autobus traffic represents the most efficient and least polluting traffic on the system. CTMS may automatically and/or the Autobus operator may adjust ramp in-flow meters and traffic semaphores that feed into a served roadway segment in order to ensure adequate Autobus outflow capacity.

CTMS uses daily traffic forecasts that may begin with a base forecast scenario drawn from area-wide historical traffic database information. Traffic demand may be estimated using statistical probability calculations. CTMS may continuously refine the forecast with information retrieved and/or received from various sources, including current traffic load information from roadway sensors and cameras and current and forecasted weather conditions. Reports on highway accidents and incidents, roadway construction underway, notices of urgent public safety traffic operations and scheduled special events are also used to update traffic forecasts and to predict or manage zones of traffic congestion. CTMS may receive information from various external sensors (e.g., ramp metering systems, in-road and/or on-road traffic count sensors, and traffic cameras).

CTMS may receive various information that used to forecast traffic, including: accident/incident reports that indicate time to clear accident/incident, number of vehicles involved, special factors such as hazardous materials; police and highway patrol reports, including drivers stopped, chase underway, dangerous and disruptive driving, slow drivers; fire department reports, including large fire vehicles underway, vehicle fires, fires requiring traffic re-routing and paramedic operations; ambulance teams including ambulances underway for emergency pickup and ambulances enroute to hospitals; Construction management reports including construction activities requiring traffic constraints or disruptions.

The detailed traffic forecasts from CTMS may be used to continuously update forecasts for Autobus and regarding Autobus. The forecasts may be refined with additional trip demand information, including: 1) reservations received from AEGPS, 2) AEGPS communications from client vehicles approaching Autobus terminals, 3) information from the CTMS that affects the scheduling of additional Autobus capacity (e.g., new construction activity, special events and severe weather).

Autobus enhanced geo-positioning system (AEGPS) may include the following components: 1) a GPS handset; with 2) an integrated toll transponder, and 3) integrated hardware and software subsystems that record and then transmit: a) trip plan information b) vehicle size characteristics, and c) vehicle location and speed information, 4) a public and/or private wireless communication system (e.g., cellular telephony system); and 5) individual trip computer system. AEGPS logic may use satellite geo-positioning technology and/or cellular telephony signal triangulation technology to determine precise position and speed of the device (and the client vehicle) at any point within a metropolitan area. A client vehicle driver may enter planned trip information (e.g., point of origin, time of departure, planned stops and final destination) on the AEGPS handset and receive geo-positioning information using the AEGPS handset. The client may then transmit the trip information using cellular telephony system to the Individual trip computer system.

As the client vehicle progresses along the trip route the AEGPS may communicate position and speed information from the client vehicle to an Autobus Individual Trip Computer System and Software (AITCSS). AITCSS may transmit the trip information to the CTMS. CTMS 1304 may use the speed and position information from many AEGPS devices traveling about a particular geographical area (e.g., regional, city, and/or metropolitan area) to determine traffic conditions. An advantage of AEGPS over traditional road loop sensors and traffic cameras is that traffic sensors and traffic cameras are exposed to the elements and to road damage and are thus very difficult to maintain. The AEGPS devices located within client vehicles do not suffer this disadvantage.

When an AEGPS handheld located in a client vehicle approaches and/or is within a configured distance of an Autobus terminal, AEGPS transmits information such as: 1) vehicle height, 2) length, 3) width, 4) weight, 5) wheelbase length, and 6) front and rear wheel track width to AFOCS. AEGPS also transmits toll payment data to the toll payment system for automated toll payment. AITCSS may receive information from Autobus client vehicle drivers via AEGPS, including the following information: point of origin, estimated time of departure, planned stops along the way and destination information. AITCSS provides the client vehicle driver with an optimized trip plan that is based on current and predicted traffic conditions. AITCSS also receives inputs from the CTMS, including: specific route and area-wide traffic conditions information (e.g., congestion zones, incidents and construction information). AITCSS also periodically refines the trip plan and communicates updated information to the driver through the EGPS located in the client vehicle. AITCSS trip plan optimizes the individual Autobus client driver's trip regardless of whether Autobus is used during the planned trip by the client.

AFOCS logic 1354 may analyze Autobus trip demand information for multiple roadway segments served by Autobus and assigns transporters to particular Autobus roadway segments and terminals based on the Autobus trip demand. AFOCS logic may assign transporters to particular Autobus roadway segments until maximum traffic inputs from feeder roads match maximum Autobus capacity for each roadway segment served by Autobus. AFOCS may also automatically schedule the departure time of Autobus transporters from unload/load docks, based on a release strategy in order to minimize, and/or eliminate random variations in transporter flows and schedules. AFOCS personnel may override AFOCS and manually allocate transporters to particular roadway segments (e.g., construction zones, special events, and/or unpredicted areas of intense congestion).

AFOCS operating personnel and/or CTMS personnel may maximize input traffic flows by adjusting traffic control systems (e.g., ramp meters and traffic light timing on feeder roads and/or lower level roads that feed into the feeder roads). In the event traffic inputs (e.g., traffic inflows) from feeder roads to Autobus serviced roadways reach potentially congestion conditions, then CTMS operations staff may slow the traffic flows into those feeder roads by setting longer waits at ramp meters and longer stop times at in-flow traffic semaphores. CTMS and/or CTMS personnel may provide traffic status messages to inbound vehicle drivers on roadway dynamic message signs and/or on the AEGPS handheld. The CTMS status messages may indicate the traffic level, traffic capacity and whether congestion is present and/or the probability of congestion for various time periods.

AFOCS may control the speed of each transporter so that transporters follow each other with a configurable and controlled gap (e.g., separation and/or spacing) based on a desired rate of speed and distance between transporters. AFOCS may control the rate of release of each transporter from the unload/load dock to control the gap between transporters. In one implementation, AFOCS automatically controls Autobus in-terminal transporter lane merges in order to control the rate that transporters exit terminals, transporter speeds and separations (e.g., spacing) between transporters. AFOCS serves to minimize random time variations in transporters leaving the docks, merging into a stream of traffic, and making the intended trips at optimum speeds and separations.

ADKS 1344 may communicate with transporter separation sensors to maintain a steady flow of Autobus transporters over a served roadway segment. ADKS may include: 1) GPS systems aboard each transporter; and 2) transporter-to-transporter separation systems. Information from various GPS systems (e.g., public and private) located in proximity to the served roadway segment, including the GPS systems onboard the transporters may be used by AFOCS to issue precise speed adjustment commands to transporters in order to achieve optimum and uniform separations and speeds of transporters. The onboard transporter-to-transporter separation systems assess transporter separations and evaluate the moment-to-moment separations based on configurable safe separation guidelines (e.g., based on speed of transporters, traffic conditions, time of day, special events, weather and/or other factors that determine safe separation between vehicles). ADKS provides emergency braking logic that is responsive to transporter separations falling below a set safe separation distance threshold. ADKS braking logic may override transporter driver operations and reduce power and apply brakes to the transporter in order to achieve desired transporter separation (e.g., a configurable safe separation distance). AKDS braking logic may determine the degree of braking and power reduction to apply based on the desired rate of change of the separation. For example, AKDS braking logic may apply gradual and minimal power reduction and braking in order to adjust a separation distance that slightly exceeds a safe separation distance threshold, and apply rapid and substantial power reduction and braking in order to adjust a separation distance that substantially exceeds a safe separation distance threshold. In one implementation, AKDS braking logic simultaneously applies power reduction and braking to multiple transporters (e.g., two transporters establish a separation distance between the transporters). In one implementation, AKDS braking logic includes safety system logic that automatically communicates transporter safety status information to Autobus control center personnel (e.g., transporter driver compliance information).

Autobus Efficient Use Incentive Toll (AEUIT) logic may be used to improve traffic demand management. AEUIT allows individual drivers to minimize and/or avoid peak period toll charges when vehicle passenger drivers use the Autobus system. Conventional toll programs attempt to reduce traffic flow of standard passenger cars at peak periods by imposing peak period charges based on vehicle capacity utilization that deter drivers from using particular roadways (e.g., encouraging the use of multi-passenger vehicles such as carpools and buses). By suppressing traffic demand, conventional toll programs attempt to reduce the inflow of cars to match traffic free-flow of 2,000 to 2,200 cars per lane per hour. Multi-passenger vehicles, including buses, are frequently exempted from such peak period demand reduction tolls. AEUIT incentives efficient use of highway capacity resources by charging Autobus vehicle drivers a significantly lower toll and penalizes inefficient use of highway capacity resources by charging a significantly higher toll fee for vehicles drivers that choose not to use the Autobus system.

Autobus traffic flow optimization may include: central traffic management system (CTMS); AITCSS; global positioning systems (GPS); weather systems; special events information (e.g., sports, emergency situations that may impact traffic patterns); Autobus transporter control systems; Autobus transporters; Autobus roadway re-entry ramp meter signals; traffic flow measurement sensors; historical traffic information database; traffic probability projection system; vehicles with enhanced GPS capabilities; non-Autobus traffic; efficient use incentive toll system; Autobus terminal load and unload system sensors and controls; human status reports (e.g., policy, fire, ambulance, incident management, and construction zones); Autobus terminal traffic control signage; roadway access ramp meter signals; telecom systems (e.g., interconnect all nodes); public broadcast systems; Autobus client vehicles; Autobus client vehicle with enhanced GPS; and Autobus flow optimization system.

Various components of the Autobus system may be implemented in many different ways. For example, although some features are shown as computer program products embodied as a signal or data stream and/or stored in computer-readable memories (e.g., as logic implemented as computer-executable instructions and/or as data structures in memory), all or part of the systems, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The systems may be implemented in software, hardware, or a combination of software and hardware. The files, schemas, and messages used by the systems may employ formats that are different from the formats described above.

The various systems and components of Autobus may be implemented with additional, different, or fewer components. As one example, a processor or any other logic may be implemented with a microprocessor, a microcontroller, a DSP, an application specific integrated circuit (ASIC), program instructions, discrete analogue or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A multiple driver occupied passenger vehicles transporter system (Autobus), the system comprising:
multiple driver occupied passenger vehicles;
a roadway segment;
an Autobus enhanced geo-positioning system (AEGPS) handset;
a vehicle transporter comprising vehicle compartments, wherein the multiple driver occupied passenger vehicles include a roadway segment traveling driver occupied passenger vehicle traveling on the roadway segment and a vehicle compartment loaded driver occupied passenger vehicle traveling on the roadway on the vehicle transporter in one of the vehicle compartments;

vehicle transporter terminals each comprising: terminal sensors; terminal lane directional aides; and a terminal dock;

a memory comprising:
location and status information for the multiple driver occupied passenger vehicles and vehicle transporter; vehicle compartment status information; terminal sensor information;
Autobus logic operable to:
analyze the terminal sensor information and the vehicle compartment status information;
actuate the terminal lane directional aides and the vehicle compartments based on the location and status information for the multiple driver occupied passenger vehicles, wherein the terminal lane directional aides identify whether the terminal dock is available to enter by the roadway segment traveling driver occupied passenger vehicle and assists the roadway segment traveling driver occupied passenger vehicle to navigate to a location in one of the vehicle transporter terminals including the terminal dock; and
communicate the vehicle compartment status and the location and status information for the multiple driver occupied passenger vehicles to a transporter driver; and
a processor coupled to the memory, wherein the processor executes the Autobus logic.

2. The system of claim 1, the vehicle compartments further comprising lower level vehicle compartments and upper level vehicle compartments.

3. The system of claim 2, the terminal dock comprising: a vehicle transporter level dock where the vehicle transporter is positioned to load and unload passenger vehicles.

4. The system of claim 3, the terminal dock further comprising a load side comprising: a lower vehicle compartment level dock for loading driver occupied passenger vehicles in the lower level vehicle compartments; and an upper vehicle compartment level dock for loading driver occupied passenger vehicles in the upper level vehicle compartments.

5. The system of claim 3, the terminal dock further comprising an unload side comprising: a lower vehicle compartment level dock for unloading driver occupied passenger vehicles in the lower level vehicle compartments; and an upper vehicle compartment level dock for unloading driver occupied passenger vehicles in the upper level vehicle compartments.

6. The system of claim 2, the vehicles compartments further comprising:
an amenities module;
a deck designated the floor of the vehicle compartment;
a roof designated the ceiling of the vehicle compartment, wherein the roof comprises a left side and a right side of the roof;
a load ramp barrier assembly designated the rear of the vehicle compartment;
an unload ramp barrier assembly designated the front of the vehicle compartment; and
a driver side panel and a passenger side panel, wherein the driver side panel and the passenger side panel each have a forward edge connected to the unload ramp barrier assembly and a rear edge connect to the load ramp barrier assembly.

7. The system of claim 6, wherein the amenities module is connected to the driver side panel, the amenities module comprising: a display; a multimedia communication device; and an environmental controls device.

8. The system of claim 7, the vehicle compartments further comprising:
a vehicle compartment frame comprising vertical frame ribs, wherein the deck, the roof, the driver side panel, the passenger side panel, the load ramp barrier assembly, and the unload ramp barrier assembly are connected to the vehicle compartment frame, and wherein the vertical frame ribs include: a front left side vertical frame rib that is connected to the unload ramp barrier assembly and the driver side panel; a front right side vertical frame rib that is connected to the unload ramp barrier assembly and the passenger side panel; a rear right side vertical frame rib that is connected to the load ramp barrier assembly and the passenger side panel; and a rear left side vertical frame rib that is connected to the load ramp barrier assembly and the driver side panel.

9. The system of claim 8, the vehicle transporter further comprising:
a transporter main frame beam assembly connected to a first vehicle compartment lift, separation and rotation assembly, wherein the transporter main frame beam assembly comprises vehicle compartment locking foot wells for the lower level vehicle compartments, and wherein the roof of each of the lower level vehicle compartments comprise vehicle compartment locking foot wells on each of the left side and right side of the roof.

10. The system of claim 9, the terminal dock further comprising:
a terminal dock ceiling; and
an overhead lift beam assembly connected to a second vehicle compartment lift, separation and rotation assembly, and wherein the overhead lift beam assembly is connected to the terminal dock ceiling.

11. The system of claim 10, the memory further comprising:
global positioning system (GPS) information; and
traffic management information, the traffic management information including: historical traffic management information; forecasted traffic information; weather forecasts; special event information; and real-time traffic information.

12. The system of claim 11, the Autobus logic comprising: Autobus flow optimization computer system (AFOCS) logic; Autobus enhanced geo-positioning system (AEGPS) logic; load/unload ramp and bridge logic; module lift logic; module separation logic; module rotation logic; vehicle wheel lock logic; and amenities module logic.

13. The system of claim 12, the amenities module logic comprising pneumatic control logic, wherein the driver occupied passenger vehicles each comprise a driver side window opening, and wherein the amenities module comprises a conformable edge that the amenities module logic adjusts to fit the amenities module in the driver side window opening.

14. The system of claim 12, the Autobus logic further comprising: Automated Distance Keeping (ADKS) logic, including braking logic and safety system logic that monitors a first transporter and a second transporter traveling the roadway and a distance between maintains separation distance between the transporters; and suspension systems logic that monitors the suspension of the vehicle transporter, determines suspension settings that minimize impulse stress loads on overpasses and bridges as the transporter travels on the overpasses and bridges.

15. The system of claim 14, wherein the load/unload ramp and bridge logic actuates the load ramp barrier assembly and the unload ramp barrier assembly.

16. The system of claim 15, wherein the module lift logic actuates the first vehicle compartment lift, separation and rotation assembly and the second vehicle compartment lift, separation and rotation assembly to lower and lift the upper vehicle compartments to and from the lower vehicle compartments and lower and lift the lower vehicle compartments to and from the transporter main frame beam assembly.

17. The system of claim 16, wherein the module separation logic actuates the first vehicle compartment lift, separation and rotation assembly and the second vehicle compartment lift, separation and rotation assembly to actuate the vertical frame ribs to join and separate the vehicle compartments to and from each other, and actuate the first vehicle compartment lift, separation and rotation assembly to lock and unlock the lower vehicle compartments to and from the transporter main frame beam assembly.

18. The system of claim 17, wherein the module rotation logic actuates the first vehicle compartment lift, separation and rotation assembly and the second vehicle compartment lift, separation and rotation assembly to rotate the vehicle compartments into position to load and unload the vehicle compartments, join and separate the vehicle compartments adjacent to each other, and lock and unlock the lower vehicle compartments to and from the transporter main frame beam assembly.

19. The system of claim 18, wherein the roadway segment is a new constructions zone, wherein the vehicle transporter terminals comprise a first vehicle transporter terminal and a second vehicle transporter terminal located on the roadway segment, and wherein the first vehicle transporter terminal is located before the new constructions zone and the second vehicle transporter terminal is located after the new constructions zone.

20. A metropolitan traffic management system, the system comprising:
  multiple roadway segments of a metropolitan area;
  roadway monitors and controls that monitor and control traffic traveling the roadway segments;
  a multiple driver occupied passenger vehicles transporter system (Autobus) comprising:
    multiple driver occupied passenger vehicles;
    an Autobus enhanced geo-positioning system (AEGPS) handset;
    a vehicle transporter comprising vehicle modules, wherein the vehicle modules comprise vehicle compartments, wherein the multiple driver occupied passenger vehicles include a roadway segment traveling driver occupied passenger vehicle traveling on the roadway segment and a vehicle compartment loaded driver occupied passenger vehicle traveling on the roadway on the vehicle transporter in one of the vehicle compartments;
  vehicle transporter terminals each comprising:
    terminal sensors, terminal lane directional aides, and a terminal dock, wherein the vehicle transporter terminals are located on the roadway segments;
  a memory comprising:
    location and status information for the multiple driver occupied passenger vehicles and vehicle transporter; vehicle compartment status information; terminal sensor information;
    Autobus logic operable to:
      analyze the terminal sensor information and the vehicle compartment status information;
      actuate the terminal lane directional aides and the vehicle compartments based on the location and status information for the multiple driver occupied passenger vehicles, wherein the terminal lane directional aides identify whether the terminal dock is available to enter by the roadway segment traveling driver occupied passenger vehicle and assists the roadway segment traveling driver occupied passenger vehicle to navigate to a location in one of the vehicle transporter terminals including the terminal dock; and
      communicate the vehicle compartment status and the location and the status information of the multiple driver occupied passenger vehicles to a transporter driver;
    roadway monitors and controls logic operable to monitor and control the autobus logic; and
  a processor coupled to the memory, wherein the processor executes the Autobus logic and the roadway monitors and controls logic.

21. The system of claim 20, wherein the Autobus logic is further operable to: assign the vehicle compartments to the multiple driver occupied passenger vehicles based on a frequency of use of the Autobus by the multiple driver occupied passenger vehicles.

22. The system of claim 20, wherein the AEGPS handset is operable to communicate location and status information of the vehicle transporter to the roadway segment traveling driver occupied passenger vehicle to identify vehicle transporter availability.

* * * * *